(12) United States Patent
Sun et al.

(10) Patent No.: US 11,245,928 B2
(45) Date of Patent: Feb. 8, 2022

(54) SYSTEMS AND METHODS FOR IMAGE PROCESSING

(71) Applicant: ZHEJIANG DAHUA TECHNOLOGY CO., LTD., Zhejiang (CN)

(72) Inventors: Zhiyong Sun, Hangzhou (CN); Zhuqing Zhu, Hangzhou (CN); Qi Chen, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/304,747

(22) Filed: Jun. 25, 2021

(65) Prior Publication Data
US 2021/0329302 A1    Oct. 21, 2021

Related U.S. Application Data

(63) Continuation of application No. PCT/CN2018/123366, filed on Dec. 25, 2018.

(51) Int. Cl.
*H04N 19/635* (2014.01)
*G06T 9/00* (2006.01)
*H04N 19/517* (2014.01)

(52) U.S. Cl.
CPC ........... *H04N 19/635* (2014.11); *G06T 9/007* (2013.01); *H04N 19/517* (2014.11)

(58) Field of Classification Search
CPC ..... H04N 19/635; H04N 19/517; G06T 9/007

USPC ....................................................... 382/232
See application file for complete search history.

(56) References Cited

U.S. PATENT DOCUMENTS

| | | | |
|---|---|---|---|
| 6,545,618 | B2 | 4/2003 | Yip |
| 6,909,810 | B2 | 6/2005 | Maeda |
| 7,272,263 | B2 | 3/2007 | Okada |
| 7,660,469 | B2 | 2/2010 | Katayama |

(Continued)

FOREIGN PATENT DOCUMENTS

| | | |
|---|---|---|
| CN | 101192303 B | 4/2010 |
| CN | 102223534 B | 3/2013 |

(Continued)

OTHER PUBLICATIONS

Shi, Shunda, Research on VLSI Implementation Technology of Arithmetic Decoding and Bit-plane Decoding in JPEG2000, Southeast University, 2011, 64 pages.

(Continued)

*Primary Examiner* — Allen C Wong
(74) *Attorney, Agent, or Firm* — Metis IP LLC

(57) ABSTRACT

A method for decoding an encoded code stream is provided. The method may include obtaining the encoded code stream. The method may include determining a plurality of code blocks based on the encoded code stream. The method may include determining a plurality of bit-planes for each of the plurality of code blocks, the plurality of bit-planes ranging from a most significant bit-plane to a least significant bit-plane. The method may include determining at least one query-plane for each of the plurality of bit-planes. The method may further include decoding each of the plurality of bit-planes based on the at least one query-plane.

20 Claims, 20 Drawing Sheets

(56) References Cited

U.S. PATENT DOCUMENTS

| | | | |
|---|---|---|---|
| 2005/0265613 A1 | 12/2005 | Fukuhara et al. | |
| 2008/0219570 A1* | 9/2008 | Marcellin | H04N 19/17 382/233 |
| 2011/0135210 A1* | 6/2011 | Liu | H04N 19/70 382/233 |

FOREIGN PATENT DOCUMENTS

| | | |
|---|---|---|
| CN | 103426189 A | 12/2013 |
| CN | 103686193 A | 3/2014 |
| CN | 102547291 B | 7/2014 |
| GB | 2536026 A | 9/2016 |
| WO | 0191454 A2 | 11/2001 |

OTHER PUBLICATIONS

Nie, Yongkang, VLSI Design of JPEG2000 Bit-plane Decoder, Xidian University, 2015, 71 pages.

Yan, Dan, Research of JPEG2000 Codec and its Application in Digital Movie, Beijing University of Posts and Telecommunications. 2007, 79 pages.

Gaetano Impoco, JPEG2000—A Short Tutorial, Visual Computing Lab-ISTI-CNR Pisa, Italy, 2004, 16 pages.

Li, Jin, Image Compression: The mathematics of JPEG 2000, Modem Signal Processing, 46: 185-221, 2003.

Kishor Sarawadekar et al., Area Efficient, High-speed VLSI Design for EBCOT Block Coder in JPEG 2000, 2010 International Conference on Electronics and Information Engineering (ICEIE 2010), 2: 110-113, 2010.

Majid Rabbani et al., An Overview of the JPEG 2000 Still Image Compression Standard, Signal Processing: Image Communication, 17(1): 3-48, 2002.

International Search Report in PCT/CN2018/123366 dated Aug. 21, 2019, 4 pages.

Written Opinion in PCT/CN2018/123366 dated Aug. 21, 2019, 3 pages.

The Extended European Search Report in European Application No. 18944967.1 dated Nov. 9, 2021, 8 pages.

Mei, Kuizhi et al., VLSI Design of a High-Speed and Area-Efficient JPEG 2000 Encoder, IEEE Transactions On Circuits and Systems for Video Technology, 17(8): 1065-1078, 2007.

* cited by examiner

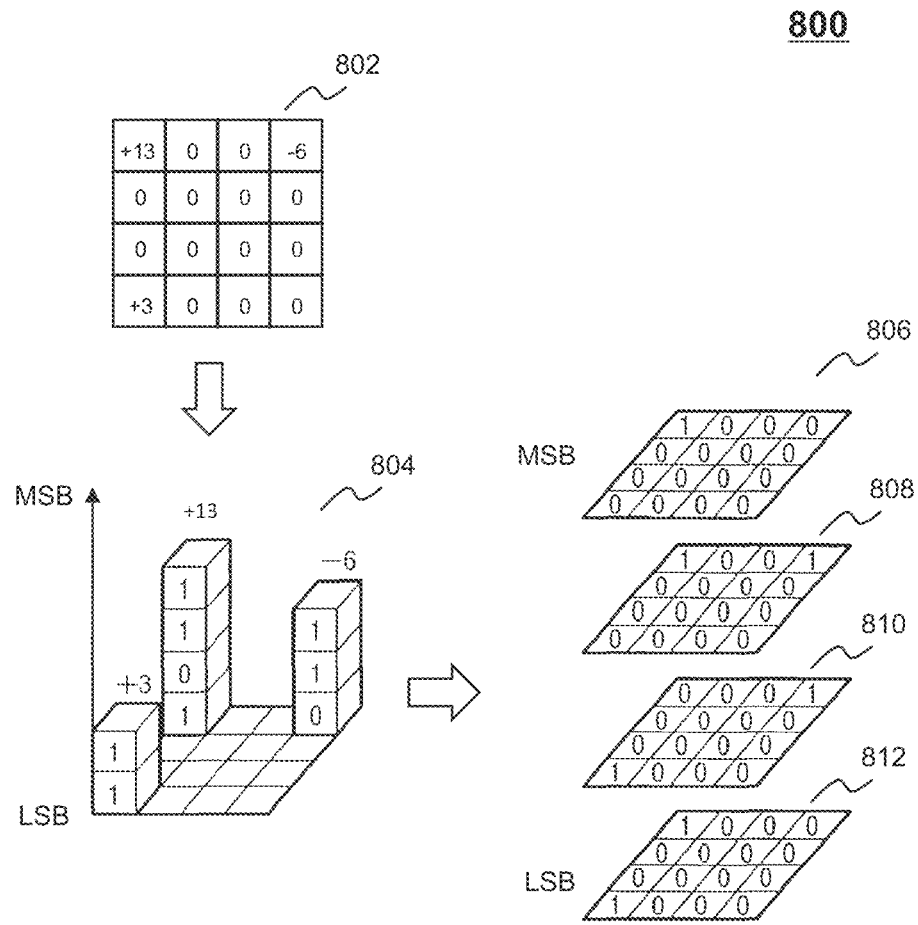
FIG. 8A
FIG. 8B
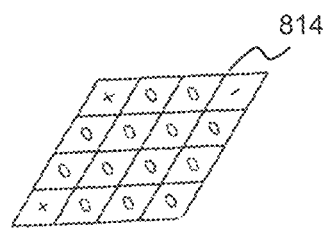
FIG. 8C
(Prior Art)

SYSTEMS AND METHODS FOR IMAGE PROCESSING

CROSS-REFERENCE TO RELATED APPLICATIONS

This application is a continuation of International Patent Application No. PCT/CN2018/123366, filed on Dec. 25, 2018, the contents of which are hereby incorporated by reference.

TECHNICAL FIELD

This disclosure generally relates to an image processing technique, and more particularly, relates to systems and methods for decoding encoded image data.

BACKGROUND

In the digital era, a digital image may provide rich information for people in their daily life. For example, a digital image may store and display information in various information devices (e.g., a cell phone, a computer, a display, a television, a camera, etc.). In the digital imaging field, an image compression technique may be applied in image storing, processing, displaying, and transmitting. A conventional image compression technique may relate to image encoding and image decoding. Some image compression techniques, for example, JPEG 2000, have been standardized by ISO (International Organization for Standardization). In some occasions, during the image encoding or decoding in JPEG 2000, it may take time to perform some unnecessary, redundant operations (e.g., the scanning bit-plane by bit-plane). Therefore, it is desirable to develop systems and methods for efficient image processing (e.g., the image encoding or decoding).

SUMMARY

In one aspect of the present disclosure, a method for decoding an encoded code stream is provided. The method may be implemented on a computing device which has at least one processor and at least one computer-readable storage medium. The method may include one or more of the following operations. The at least one processor may obtain the encoded code stream. The at least one processor may determine a plurality of code blocks based on the encoded code stream. The at least one processor may determine a plurality of bit-planes for each of the plurality of code blocks, the plurality of bit-planes range from a most significant bit-plane to a least significant bit-plane. The at least one processor may determine at least one query-plane for each of the plurality of bit-planes. The at least one processor may decode, based on the at least one query-plane, each of the plurality of bit-planes.

In some embodiments, the at least one query-plane may include at least one of a first query-plane corresponding to a significance propagation pass, a second query-plane corresponding to a magnitude refinement pass, or a third query-plane corresponding to a cleanup pass.

In some embodiments, the at least one processor may determine, based on a first significance-plane and a first undecoded-plane, the first query-plane.

In some embodiments, the at least one processor may determine, based on a second significance-plane and a second undecoded-plane, the second query-plane.

In some embodiments, the at least one processor may determine, based on a third undecoded-plane, the third query-plane.

In some embodiments, the first query-plane, the second query-plane, and the third query-plane may be associated with each other.

In some embodiments, the at least one processor may decode the each of the plurality of bit-planes along the significance propagation pass, the magnitude refinement pass, or the cleanup pass.

In some embodiments, the at least one processor may decode the most significant bit-plane along the cleanup pass. The at least one processor may decode the other bit-planes of the plurality of bit-planes excluding the most significant bit-plane along the significance propagation pass, the magnitude refinement pass, and the cleanup pass.

In some embodiments, for each of the other bit-planes of the plurality of bit-planes excluding the most significant bit-plane, the at least one processor may predict a decision regarding a current decoding bit along the most significance pass. The at least one processor may decode first bits of the bit-plane corresponding to the most significance pass by searching, according to a first searching algorithm, the first query-plane based on the predicted decision. The at least one processor may decode second bits of the bit-plane corresponding to the magnitude refinement pass by searching, according to a second searching algorithm, the second query-plane. The at least one processor may decode third bits of the bit-plane corresponding to the cleanup pass by searching, according to a third searching algorithm, the third query-plane.

In some embodiments, the first searching algorithm, the second searching algorithm, or the third searching algorithm may include at least one of a sequential search algorithm, a binary search algorithm, an interpolation search algorithm, a binary hash search algorithm, a binary search tree algorithm, or a Fibonacci search algorithm.

In some embodiments, the first searching algorithm, the second searching algorithm, and the third searching algorithm may be the same or different.

In another aspect of the present disclosure, a system for decoding an encoded code stream is provided. The system may include a storage device storing a set of instructions, and at least one processor in communication with the storage device. When executing the set of instructions, the at least one processor may be configured to cause the system to execute one or more of the following operations. The at least one processor may obtain the encoded code stream. The at least one processor may determine a plurality of code blocks based on the encoded code stream. The at least one processor may determine a plurality of bit-planes for each of the plurality of code blocks, the plurality of bit-planes range from a most significant bit-plane to a least significant bit-plane. The at least one processor may determine at least one query-plane for each of the plurality of bit-planes. The at least one processor may decode, based on the at least one query-plane, each of the plurality of bit-planes.

In yet another aspect of the present disclosure, a non-transitory computer readable medium is provided. The non-transitory computer readable medium storing instructions, the instructions, when executed by at least one processor of a system, may cause the system to implement a method. The method may include one or more of the following operations. The at least one processor may obtain the encoded code stream. The at least one processor may determine a plurality of code blocks based on the encoded code stream. The at least one processor may determine a plurality of bit-planes for each of the plurality of code blocks, the plurality of bit-planes range from a most significant bit-plane to a least significant bit-plane. The at least one processor may determine at least one query-plane for each of the plurality of bit-planes. The at least one processor may decode, based on the at least one query-plane, each of the plurality of bit-planes.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIGS. 8A-8C are schematic diagrams illustrating an exemplary bit-plane decomposition process according to some embodiments of the present disclosure;

DETAILED DESCRIPTION

Figure 1:
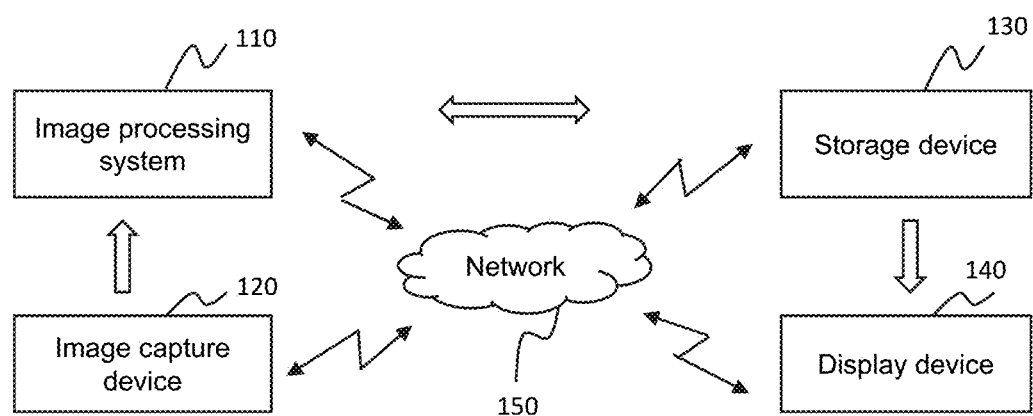
FIG. 1 is a schematic diagram illustrating an exemplary application of an exemplary image processing system according to some embodiments of the present disclosure.

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "module," and/or "unit" used herein are one method to distinguish different components, elements, parts, section or assembly of different level in ascending order. However, the terms may be displaced by another expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

For illustration purposes, the following description is provided to help better understanding an image compression method or system. It should be noted that "image" may refer to a still picture, or a video frame. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

Various embodiments of the present disclosure may be provided as an image processing system configured to perform image encoding and image decoding. In some embodiments, the system may encode source image data to generate compressed data (e.g., code stream). In some embodiments, the system may decode the compressed code stream to reconstruct the image data. For example, the system may decompose the code stream to a plurality of code blocks. The system may determine a plurality of bit-planes of the code block. The system may decode each of the plurality of bit-planes along a decoding pass (e.g., the significance propagation pass, the magnitude refinement pass, and a cleanup pass). In some embodiments, for the decoding along a significance propagation pass, the system may decode a bit-plane according to a first query-plane. The first query-plane may include information regarding first coefficient bits to be decoded in the significance propagation pass. The first query-plane may be determined based on a first significance-plane and a first undecoded-plane. In some embodiments, the system may predict a decision regarding a coefficient bit before decoding the coefficient bit. In some embodiments, for the decoding along magnitude refinement pass, the system may decode the bit-plane according to a second query-plane. The second query-plane may include information regarding second coefficient bits to be decoded along the magnitude refinement pass. The second query-plane may be determined based on a second significance-plane and a second undecoded-plane. In some embodiments, for the decoding along a cleanup pass, the system may decode the bit-plane according to a third query-plane. The third query-plane may include information regarding third coefficient bits to be decoded along the cleanup pass. The third query-plane may be determined based on a third undecoded-plane. It is highly efficient to determine coefficient bits to be decoded by searching the query-plane, instead of scanning bit by bit during the decoding for each bit-plane. In some embodiments, during the decoding for each bit-plane, the system may also decode the coefficient bits in parallel. This may reduce or avoid the waiting period between the processing of successive coefficient bits, thereby further improving the efficiency. The following descriptions are provided with reference to the image compression standard and coding system JPEG 2000 for illustration purposes and not intended to be limiting. It is understood that embodiments of the systems and methods disclosed herein may be applied to other image compression standard and/or coding system.

FIG. 1 is a schematic diagram illustrating an exemplary application of an exemplary image processing system according to some embodiments of the present disclosure. Image processing system 110 may be used in various fields including, for example, a security technology, a transportation management, a prison system, a communication industry, an energy field, a medical treatment, an education system, a financial service, or the like, or any combination thereof.

Image processing system 110 may be configured to process image data, such as image encoding or image decoding. Image processing system 110 or a portion thereof may be implemented in a digital camera. In some embodiments, image processing system 110 may include one or more processors to perform operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), or any circuit or processor capable of executing one or more functions, or the like, or any combinations thereof.

In some embodiments, image processing system 110 may also include a memory configured to store data and/or instructions. In some embodiments, the memory may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a still RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the memory may be configured to store one or more programs and/or instructions that may be executed by the processor(s) of image processing system 110 to perform exemplary methods described in this disclosure. For example, the memory may be configured to store program(s) and/or instruction(s) executed by the processor(s) of image processing system 110 to encode image data, decode image data, and/or scale an image. For example, a ROM may store a coding mode (e.g., Huffman coding) for image processing system 110 to encode data.

In some embodiments, the image data may be derived from an image, for example, a still image or a video frame of a video. The image may include a digital image, an optical image, or an analog image, or the like, or any combination thereof. The digital image may include a raster image, a bitmapped image, a vector image, or any other image represented by numeric, or the like, or any combination thereof. In some embodiments, the image processing system 110 may communicate with other devices, such as image capture device 120, storage device 130, or other external devices via network 150.

Image capture device 120 may be configured to capture an image. The image may include corresponding image data. Merely by way of example, image capture device 120 may include a digital camera configured to capture a still image or a video. The digital camera may include a 2D camera, a 3D camera, a panoramic camera, a VR camera, a web camera, an instant picture camera, or the like, or any combination thereof. The digital camera may be mounted in a medical imaging equipment, a night vision equipment, a radar system, a sonar system, an electronic eye, a camcorder, a thermal imaging device, a smartphone, a tablet PC, a laptop, a wearable device (e.g., a 3D glasses), an eye of a robot, or the like, or any combination thereof. The digital camera may include an optical sensor, a radio detector, an artificial retina, a mirror, a telescope, a microscope, or the like, or any combination thereof. For example, the digital camera may include a compact camera, a manual-focus camera, an autofocus camera, a telephoto camera, a wide angle camera, a single lens reflex (SLR) camera, a digital single lens reflex (DSLR) camera, or the like, or any combination thereof.

In some embodiments, image capture device 120 may include one or more imaging sensors. The imaging sensor may detect and/or transmit image data. The imaging sensor may include an analog imaging sensor and/or a digital imaging sensor. The imaging sensor may contain a video camera tube, a vacuum tube, a semiconductor charge-coupled devices (CCD) or an active pixel sensor (e.g., a complementary metal-oxide-semiconductor (CMOS) or an N-type metal-oxide-semiconductor (NMOS)), or the like, or any combination thereof. In some embodiments, the imaging sensor may be covered by a color filter array (CFA) to capture color-filtered image data. Image data generated by the imaging sensor with the CFA may be designated as CFA image data. The CFA may filter the light with a certain wavelength range to pixel sensors of the imaging sensor. The CFA may include a Bayer filter, a RGB (red, green and blue) filter, a CYYM (cyan, yellow, yellow and magenta) filter, a CYGM (cyan, yellow, green and magenta) filter, a RGBW (red, green, blue and white) filter (e.g., RGBW #1, RGBW #2, RGBW #3). The most common CFA may be the Bayer filter. The Bayer filter may arrange red, green, and blue color filters on a square grid. The square grid may be arranged by 50% green filters, 25% red filters, and 25% blue filters. Image data generated by the imaging sensor with the Bayer filter is designated as Bayer image data.

In some embodiments, the data captured and/or collected by image capture device 120 may include raw data, processed data, control data, interaction data, image data, video data, analog data, digital data, or the like, or any combination thereof. In some embodiments, the image data may be a one-dimensional image, a two-dimensional image (e.g., a photograph), a three-dimensional image, or a screen display image, or any combination thereof. In some embodiments, the image data may refer to values of pixels, texels, surfels, or voxels of an image.

In some embodiments, image capture device 120 may capture and/or collect image data based on electromagnet waves with various wavelengths and/or frequencies. In some embodiments, the electromagnet waves may include radio waves, microwaves, infrared radiation, visible light, ultraviolet radiation, X-rays, gamma rays, or the like, or any combination thereof.

Storage device 130 may be configured to store information that may be accessible to other components of system 100 (the components of system 100, including image processing system 110, image capture device 120, storage device 130, and/or display device 140). The information may include data, programs, software, algorithms, text, number, or the like, or any combination thereof. The information may be obtained from image processing system 110, image capture device 120, display device 140, or network 150, or other modules or units, or any combination thereof.

In some embodiments, storage device 130 may be a hard disk drive, a solid-state drive, a removable storage drive. Merely by way of example, the removable storage drive may include a flash memory disk drive, a hard drive, a tape, a CD-ROM, cloud storage, an optical disk drive, or the like, or any combination thereof.

Display device 140 may be configured to display information. In some embodiments, display device 140 may include a keyboard, a liquid crystal display (LCD), a light emitting diode (LED) based display, a flat or curved panel display, a cathode ray tube (CRT), a 3D display, a plasma display panel, a touch screen, a mouse, a remote controller, or the like, or any combination thereof. In some embodiments, the information displayed on display device 140 may include an image, a user interface, a value, a text, control information, a program, software, an algorithm, or the like, or any combination thereof. The image displayed may include original images, compressed images, scaled images, etc. The user interface may be a user interaction interface, a graphical user interface, or a user-defined interface, etc.

Network 150 may be configured to facilitate communications among the components of system 100, including image processing system 110, image capture device 120, storage device 130, and/or display device 140. For example, data may be transmitted via network 150 from image capture device 120 to image processing system 110. As another example, data processed and/or generated by image processing system 110 may be transmitted via network 150 to storage 130 and/or display device 140. In some embodiments, network 150 may be a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, image processing system 110, image capture device 120, storage device 130, display device 140, and network 150 may be connected to or communicate with each other directly or indirectly.

In some embodiments, two or more components of image processing system 110, image capture device 120, storage device 130, display device 140, and network 150 may be integrated. In some embodiments, image processing system 110 may be implemented in image capture device 120, storage device 130, display device 140, or network 150, or any combination thereof.

In some embodiments, image processing system 110, image capture device 120, storage device 130, and/or display device 140 may be integrated with each other. For example, image processing system 110 and storage device 130 may be integrated into a single device. For example, image processing system 110 and image capture device 120 may be integrated into a single device. In some embodiments, one or more of the above devices may be located remote from each other. Merely by way of example, image processing system 110 may be implemented on a cloud platform (e.g., a cloud computing platform or a cloud storing platform).

It should be understood that the devices illustrated in FIG. 1 may be implemented in various ways. For example, in some embodiments, the devices may be implemented through hardware, software, or a combination thereof. Herein, the hardware may be implemented by a dedicated logic; the software may be stored in the storage, the system may be executed by proper instructions, e.g., by a microprocessor or dedicated design hardware. Those skilled in the art can understand that, the method and system above may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The system and the module in the present disclosure may be implemented by a hardware circuit in a programmable hardware device in an ultra large scale integrated circuit, a gate array chip, a semiconductor such a transistor, a field programmable gate array, a programmable logic device, a software performed by various processors, or a combination thereof (e.g., firmware).

Figure 2:
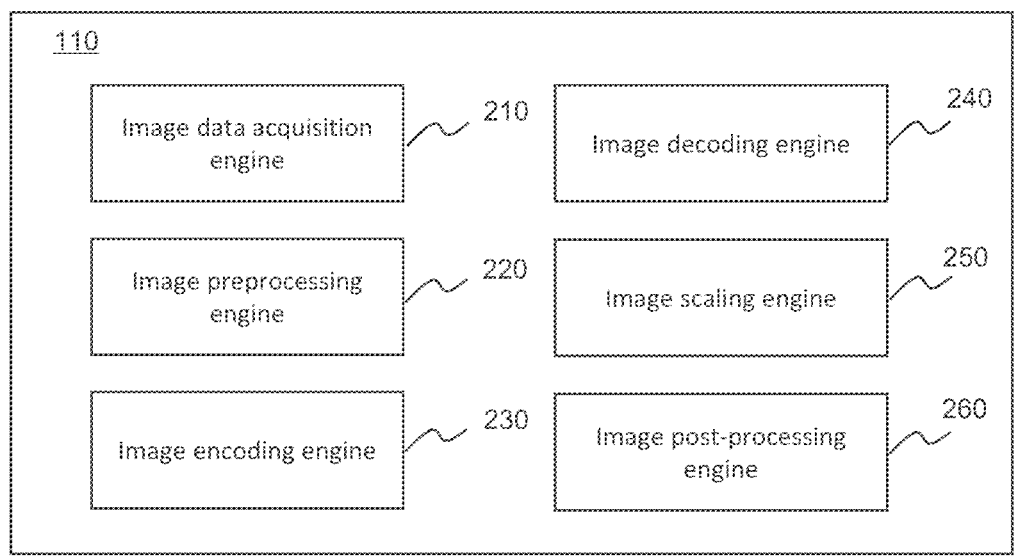
FIG. 2 is a schematic diagram illustrating an exemplary image processing system according to some embodiments of the present disclosure.

FIG. 2 is a schematic diagram illustrating an exemplary image processing system according to some embodiments of the present disclosure. In some embodiments, image processing system 110 illustrated in FIG. 2 may be implemented on a computing device. The computing device may include a personal computer (PC), a server, a mobile device, or other types of workstations or terminal devices. Generally, the words "engine," "module," and "unit" as used herein, refer to logic embodied in hardware or firmware, or to a collection of software instructions. The engines, modules, and units described herein may be implemented as software and/or hardware modules and may be stored in any type of non-transitory computer-readable medium or another storage device. In some embodiments, a software module can be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

Referring to FIG. 2, the image processing system 100 may include an image data acquisition engine 210, an image pre-processing engine 220, an image encoding engine 230, an image decoding engine 240, an image scaling engine 250, and an image post-processing engine 260.

Image data acquisition engine 210 may be configured to receive data. In some embodiments, the data may include raw data, processed data, control data, interaction data, image data, video data, analog data, digital data, or the like, or any combination thereof. The image data may be obtained from an image (e.g., a still image) or a video (or a video frame thereof). For example, the image data may include color image data, CFA image data, Bayer image data, digital image data, or analog image data, or the like, or any combination thereof. In some embodiments, the data may be acquired from image capture device 120, storage device 130, display device 140, or network 150, or other device capable of generating data, or the like, or any combination thereof.

Image pre-processing engine 220 may be configured to preprocess the received data. For example, the image pre-processing engine 220 may preprocess source image data received from the image acquisition engine 210. Specifically, the image pre-processing engine 220 may perform the preprocess operation including image tiling, DC level shifting, and/or color transforming. The image pre-processing engine 220 may divide a whole source image into one or more image tiles. In some embodiments, the image tiles may include rectangular and non-overlapping blocks of an equal size. For each component of an image tile (e.g., red component, green component, or blue component), the image pre-processing engine 220 may perform the DC level shifting by samples (i.e., pixel values) of the image tile component minus a same quantity, for example, $2^{P-1}$, where P is the component's depth. In some embodiments, the image pre-processing engine 220 may perform the color transform for each image tile after the DC level shifting. For example, the image pre-processing engine 220 may perform a reversible color transform (RCT), and/or an irreversible color transform (ICT).

In some embodiments, the preprocessed data may be further processed by image encoding engine 230, image scaling engine 250, and/or image post-processing engine 260. In some embodiments, the pre-processed data may be stored in a local storage or storage device 130 (via network 150). In some embodiments, the image pre-processing engine 220 may communicate with image data acquisition engine 210, image encoding engine 230, image scaling engine 240, and image post-processing engine 260, or the like, or any combination thereof. In some embodiments, the image pre-processing engine 220 may be integrated with image encoding engine 230, or image post-processing engine 260, or any combination thereof. In some embodiments, image pre-processing engine 220 may be optional.

Figure 6:
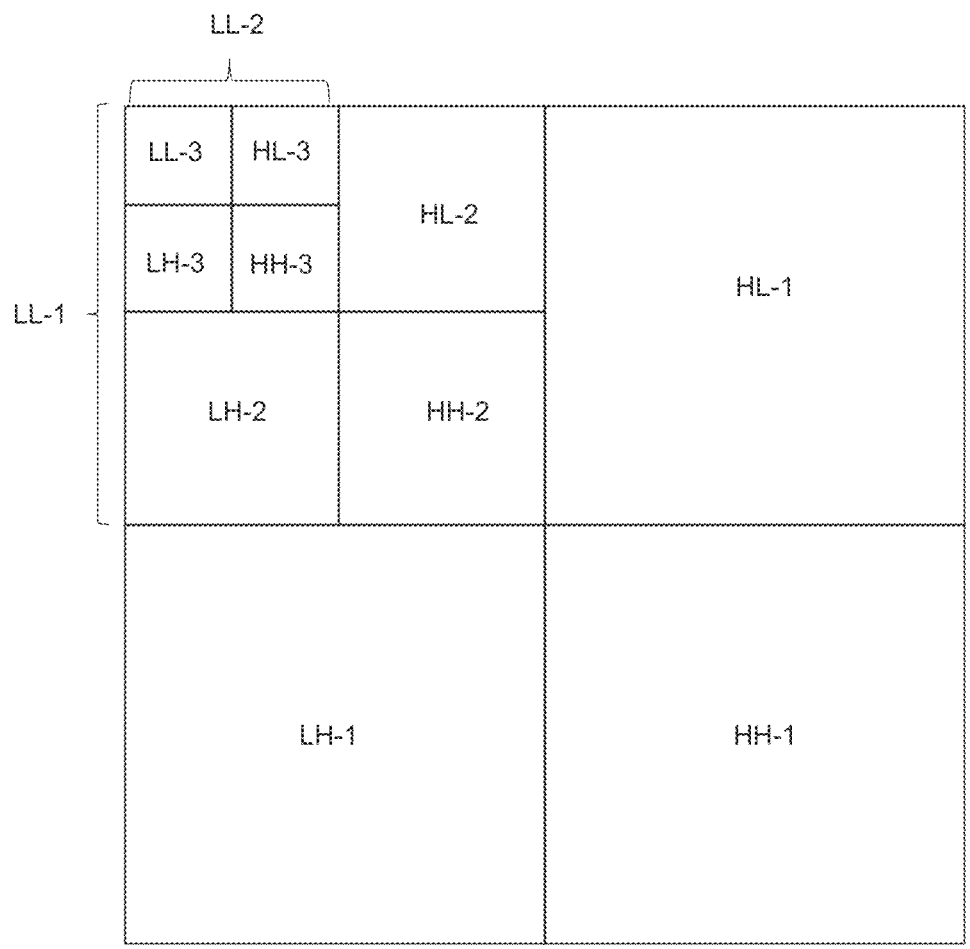
FIG. 6 is a schematic diagram illustrating exemplary subbands resulted from three times of wavelet transform according to some embodiments of the present disclosure.

In some embodiments, the image encoding engine 230 may be configured to encode the image data. In some embodiments, in JPEG 2000, the image encoding engine 230 may perform forward transform for each preprocessed image tile, for example, a two dimensional (2D) wavelet transform. The image encoding engine 230 may generate transform coefficients by the 2D wavelet transform. During the 2D wavelet transform, one or more subbands may be generated (e.g., as illustrated in FIG. 6). In some embodiments, the image encoding engine 230 may quantize the transform coefficients by using scalar quantization. The image encoding engine 230 may map the transform coefficients to quantization coefficients. The quantization coefficient may be encoded as part of the compressed code stream. In some embodiments, the image encoding engine 230 may perform the entropy encoding after the quantization. For example, the image encoding engine 230 may divide each subband into non-overlapping code blocks. The code blocks may be as input of the entropy encoding. In some embodiments, the image encoding engine 230 may encode each code block independently, without reference to other code blocks. A code block may be decomposed to one or more bit-planes ranging from a most significant bit-plane (MSB) to a least significant bit-plane (LSB). In some embodiments, for each code block, the image encoding engine 230 may perform the bit-plane encoding for each bit-plane of the code block. In some embodiments, the image encoding engine 230 may encode the bit-plane along a significance propagation pass (SIG pass), a magnitude refinement pass (REF pass), and/or a cleanup pass (CLN pass). In some embodiments, the image encoding engine 230 may perform an arithmetic coding after the bit-plane encoding. The image encoding engine 230 may generate a compressed code stream through the entropy encoding (e.g., the bit-plane encoding and the arithmetic coding). The compressed code stream may be stored and/or transmitted to other components of the image processing system 110 (e.g., the image decoding engine 240).

Figure 3:
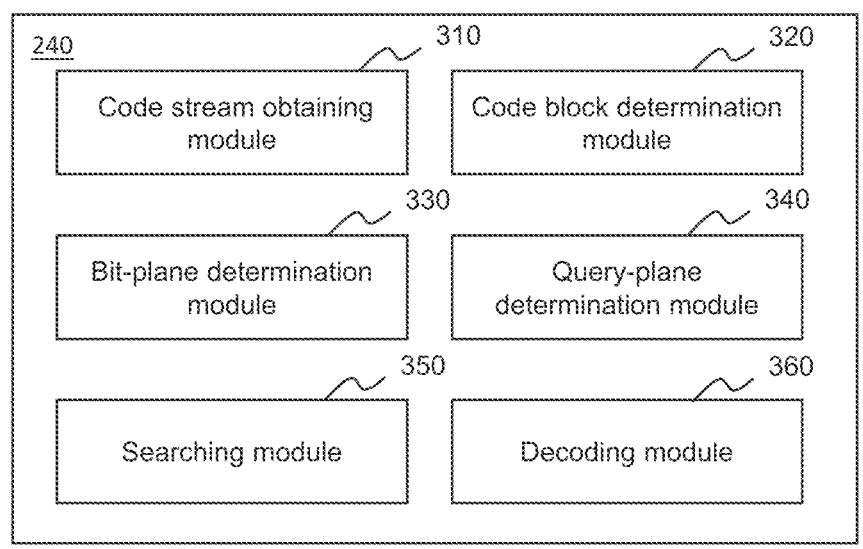
FIG. 3 is a schematic diagram illustrating an exemplary image decoding engine according to some embodiments of the present disclosure.

In some embodiments, the image decoding engine 240 may be configured to decode image data (e.g., compressed code stream). In some embodiments, as illustrated in FIG. 3, the image decoding engine 240 may include functional blocks such as a code stream obtaining module 310, a code block determination module 320, a bit-plane determination module 330, a query-plane determination module 340, a searching module 350, and/or a decoding module 360.

Specifically, the code stream obtaining module 310 may obtain the encoded code stream from the imaging encoding engine 230. The code stream may indicate information regarding a plurality of code blocks of each image tile of the source image. In some embodiments, the code stream may include a main header, and a plurality of tile streams corresponding to the main header. The tile stream may indicate information of the image tile. A tile stream may include a tile header, and a packet stream corresponding to the tile header. The packet stream may indicate information of the packets included in the image tile. A packet may include a packet header, and compressed data corresponding to the packet header. In some embodiments, the packet may include one or more code blocks. Therefore, the compressed data in the packet may indicate encoded data corresponding to the one or more code blocks.

In some embodiments, the code block determination module 320 may determine the plurality of code blocks based on the obtained code stream. For example, the code block determination module 320 may obtain compressed data of the plurality of code blocks by parsing the code stream. Specifically, the code block determination module 320 may obtain a packet header, and determine the packet indicated by the packet header. The code block determination module 320 may further determine the plurality of code blocks included in the packet, and obtain compressed data corresponding to the plurality of code blocks.

In some embodiments, the bit-plane determination module 330 may determine a plurality of bit-planes for each of the plurality of code blocks. For example, the bit-plane determination module 330 may further parse the plurality of packets to determine the plurality of bit-planes corresponding to the code block.

Figure 4A:
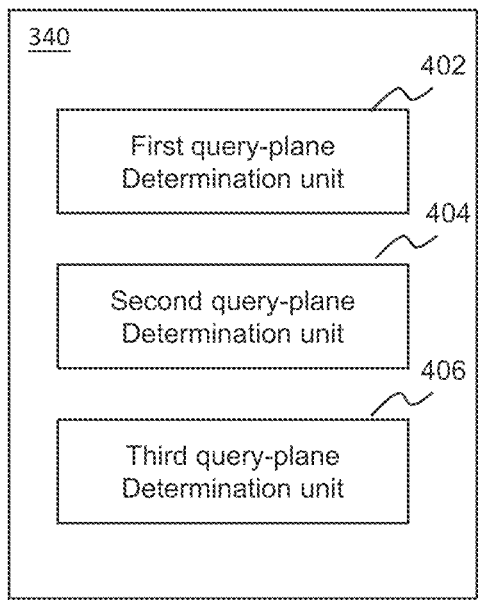
FIG. 4A is a schematic diagram illustrating an exemplary query-plane determination module according to some embodiments of the present disclosure.
Figure 4B:
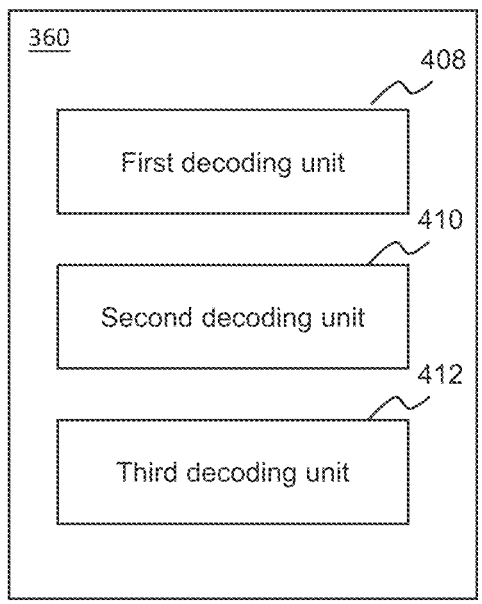
FIG. 4B is a schematic diagram illustrating an exemplary decoding module according to some embodiments of the present disclosure

In some embodiments, the query-plane determination module 340 may determine at least one query-plane for each of the plurality of bit-planes. In some embodiments, as illustrated in FIG. 4A, the query-plane determination module 340 may further include a first query-plane determination unit 402, a second query-plane determination unit 404, and a third query-plane determination unit 406. Specifically, the first query-plane determination unit 402 may determine a first query-plane corresponding to the significance propagation pass. The second query-plane determination unit 404 may determine a second query-plane corresponding to the magnitude refinement pass. The third query-plane determination unit 406 may determine a third query-plane corresponding to the cleanup pass.

As used herein, the query-plane (e.g., the first query-plane 1206, the second query-plane 1306, and the third query-plane 1404) may include a two-dimensional array of positions of the coefficient bits of the bit-plane to be decoded during the current decoding pass (e.g., the significance propagation pass, the magnitude refinement pass, or the cleanup pass). In some embodiments, the query-plane may indicate the coefficient bits to be decoded. In the query-plane, a binary-value variable of the element may be used to indicate whether or not a coefficient bit needs to be decoded. For example, assuming that $q[i,j]$ denotes an element of the query-plane, where i denotes a position in the horizontal direction of the query-plane, j denotes a position in the vertical direction of the query-plane. If the value of the element $q[i, j]$ is 1, which means the coefficient bit corresponding to the $q[i,j]$ may need to be decoded. As another example, if the value of the element $q[i, j]$ is 0, which means the coefficient bit corresponding to the $q[i, j]$ may not need to be decoded.

Figure 12:
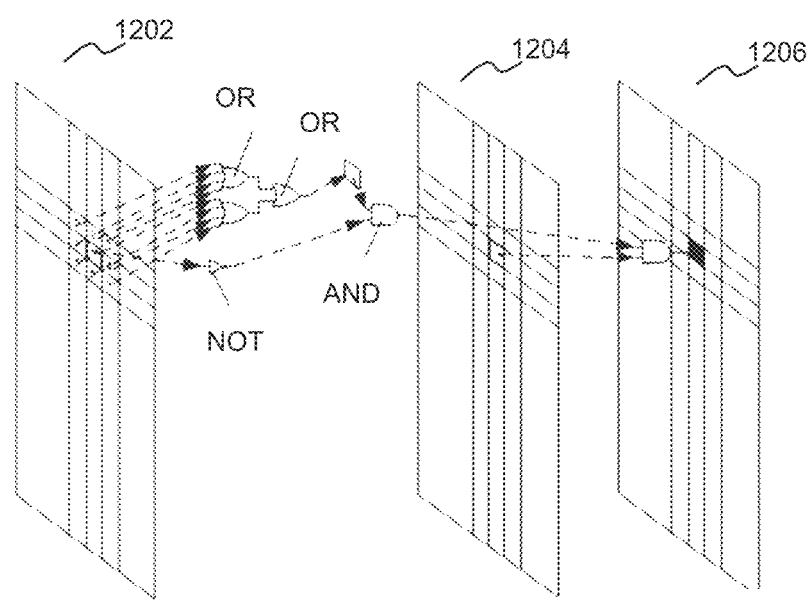
FIG. 12 is a schematic diagram illustrating an exemplary process for determining a first query-plane corresponding to a significance propagation pass according to some embodiments of the present disclosure.

In some embodiments, the first query-plane determination unit 402 may the first query-plane based on a first significance-plane and a first undecoded-plane. The first query-plane may include first coefficient bits to be decoded along the significance propagation pass. As illustrated in FIG. 12, the first query-plane determination unit 402 may determine the first query-plane 1206 by performing logic operations for the first significance-plane 1202 and the first undecoded-plane 1204. The logic operations may include an OR operation, a NOT operation, and an AND operation.

Figure 13:
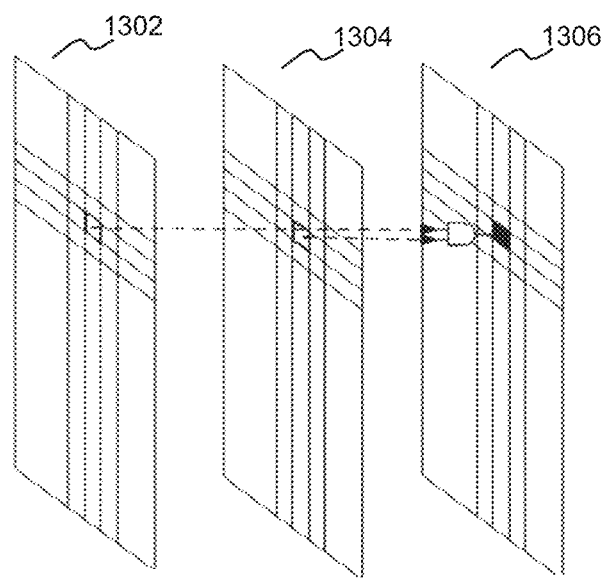
FIG. 13 is a schematic diagram illustrating an exemplary process for determining a second query-plane corresponding to a magnitude refinement pass according to some embodiments of the present disclosure.

In some embodiments, the second query-plane determination unit 404 may determine the second query-plane based on a second significance-plane and a second undecoded-plane. The second query-plane may include second coefficient bits to be decoded along the magnitude refinement pass. As illustrated in FIG. 13, the second query-plane determination unit 404 may determine the second query-plane 1306 by performing logic operations (e.g., an AND operation, an OR operation, a NOT operation) for the second significance-plane 1302 and the second undecoded-plane 1304.

Figure 14:
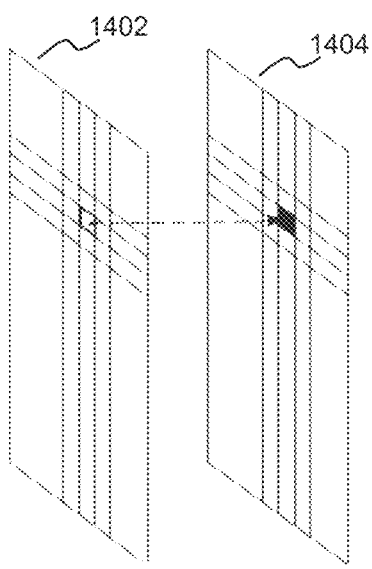
FIG. 14 is a schematic diagram illustrating an exemplary process for determining a third query-plane corresponding to a cleanup pass according to some embodiments of the present disclosure.

In some embodiments, the third query-plane determination unit 406 may determine the third query-plane based on a third undecoded-plane. The third query-plane may include third coefficient bits to be decoded along the cleanup pass. As illustrated in FIG. 14, the third query-plane determination unit 406 may designate the third undecoded-plane 1402 as the third query-plane 1404. More descriptions of determining the first query-plane, the second query-plane and the third query-plane may be found elsewhere in the present disclosure (e.g., FIGS. 11-15C, and the descriptions thereof).

In some embodiments, the searching module 350 may be configured to search the coefficient bits to be decoded. For example, the searching module 350 may obtain first coefficient bits to be decoded by searching the first query-plane according to a first searching algorithm. The searching module 350 may obtain second coefficient bits to be decoded by searching the second query-plane according to a second searching algorithm. The searching module 350 may obtain third coefficient bits to be decoded by searching the third query-plane according to a third searching algorithm. In some embodiments, the first searching algorithm, the second searching algorithm, and the third searching algorithm may be the same or different. For example, the first searching algorithm, the second searching algorithm, or the third searching algorithm may include but not limited to a sequential search algorithm, a binary search algorithm, an interpolation search algorithm, a binary hash search algorithm, a binary search tree algorithm, or a Fibonacci search algorithm.

In some embodiments, the decoding module 360 may decode each of the plurality of bit-planes based on the at least one query-plane. In some embodiments, as illustrated in FIG. 4A, the decoding module 360 may include a first decoding unit 408, a second decoding unit 410, and a third decoding unit 412. Specifically, the first decoding unit 408 may decode, based on the first query-plane, the bit-plane along the significance propagation pass. The second decoding unit 410 may decode, based on the second query-plane, the bit-plane along the magnitude refinement pass. The third decoding unit 412 may decode, based on the third query-plane, the bit-plane along the cleanup pass.

In some embodiments, the decoding module 360 may decode the plurality of bit-planes ranging from the MSB to the LSB in sequence. The decoding module 360 may firstly decode the MSB only along the cleanup pass. For example, the third decoding unit 412 may decode the MSB based on the query-plane corresponding to the cleanup pass (e.g., the third query-plane). The third decoding unit 412 may decode the coefficient bits included in the third query-plane associated with the MSB. After completion of decoding the MSB, the decoding module 360 may decode the other bit-planes of the plurality of bit-planes excluding the MSB along at least one of the significance propagation pass, the magnitude refinement pass, and the cleanup pass. For each of the other bit-planes, the first decoding unit 408 may firstly decode first coefficient bits of the bit-plane along the significance propagation pass, then the second decoding unit 410 may decode second coefficient bits of the bit-plane along the magnitude refinement pass, and the third decoding unit 412 may decode third coefficient bits of the bit-plane along the cleanup pass. In some embodiments, the first decoding unit 408 may perform a prediction process when decoding the first coefficient bits. In some embodiments, the decoding module 360 may further perform an inverse quantization, an inverse transform for each code block. The decoding module 360 may generate a reconstructed image data after the inverse transform. More descriptions about the decoding may be found elsewhere in the present disclosure (e.g., FIG. 5 or FIGS. 11-16, and the descriptions thereof).

In some embodiments, the image scaling module 250 may be configured to scale the image data (e.g., the reconstructed image data) by using one or more algorithms. The image scaling refers to a resizing of a digital image. The algorithms may include a Nearest-neighbor interpolation, a Bilinear and bicubic algorithm, a Sinc and Lanczos resampling, a Box sampling, Mipmap, a Fourier transform methods, an Edge-directed interpolation, a Vectorization, an hqx, or the like, or any combination thereof. The image scaling engine 250 may enlarge or reduce the physical size of the image by changing the number of pixels of the image.

In some embodiments, image post-processing engine 260 may be configured to post-process image data. In some embodiments, the post-processing may include a rendering, a fusion, a clipping, a binaryzation, an enhancement, or the like, or any combination thereof. In some embodiments, the post-processed data may be adjusted by the image post-processing engine 260. The adjustment may include an enhancement of the image data, an adjustment of region of interest, or the like, or any combination thereof. In some embodiments, the post-processed data may be used in applications including target acquisition, surveillance, night vision, homing, tracking, thermal efficiency analysis, environmental monitoring, industrial facility inspections, remote temperature sensing, short-ranged wireless communication, spectroscopy, weather forecasting, observation of blood flow in the skin, or the like, or any combination thereof.

It should be noted that the above descriptions of the image processing system 110 are merely provided for the purposes of illustration, and not intended to limit the scope of the present disclosure. For persons having ordinary skills in the art, various modifications and changes in the forms and details of the application of the above method and system may occur without departing from the principles of the present disclosure. For example, the code stream obtaining module 310 and the bit-plane determination module 330 may be integrated into a single module. As another example, the first decoding unit 408 may update the first query-plane during the decoding for the significance propagation pass, the second decoding unit 410 may update the second query-plane during the decoding for the magnitude refinement pass, and the third decoding unit 412 may update the third query-plane during the decoding for the cleanup pass. However, those variations and modifications also fall within the scope of the present disclosure.

Figure 5:
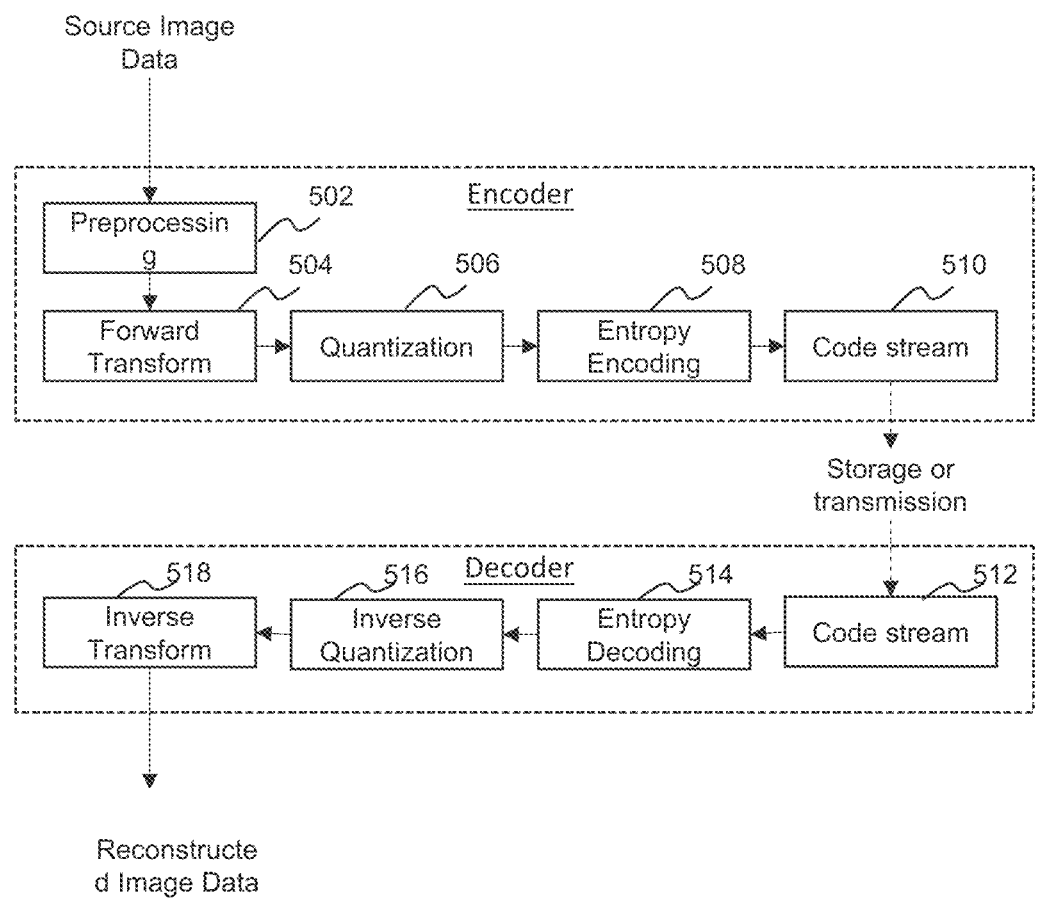
FIG. 5 is a schematic diagram illustrating an exemplary JPEG 2000 image compression engine according to some embodiments of the present disclosure.

To facilitate understanding of the present disclosure, an encoding and decoding scheme (e.g., JPEG 2000) is described below. JPEG 2000 is standardized by ISO (International Organization for Standardization). JPEG 2000 is a popular image compression technique for still images. FIG. 5 illustrates an exemplary JPEG 2000 image compression engine according to some embodiments of the present disclosure. As shown in FIG. 5, JPEG compression engine 2000 may include an encoder arrangement and a decoder arrangement. The encoder arrangement may be configured to encode image data. The decoder arrangement may be configured to decode the image data encoded by the encoder.

Source image data may be input to the encoder arrangement. The source image data may be preprocessed (502) by a preprocessing unit. In some embodiments, the preprocessing may include image tiling, DC level shifting, and color transforming. The preprocessing unit may divide a whole source image into one or more image tiles. In some embodiments, the image tiles may include rectangular and non-overlapping blocks of an equal size. For each component (e.g., red component, green component, or blue component) of an image tile, the DC level shifting means that samples (i.e., pixel values) of components of the image tile are subtracted by a same quantity, for example, $2^{P-1}$, where P is the depth of a component. The depth of a component (e.g., a color depth) is also referred to as a bit depth, which is the number of bits used for a color component. In some embodiments, the preprocessing unit may perform the color transform for each image tile after the DC level shifting. Two color transforms are defined in JPEG 2000. One is reversible color transform (RCT) that is integer-to-integer, and is intended for lossless coding. The other is irreversible color transform (ICT) that is the same as an RGB to YCbCr transform. In some embodiments, the RCT may be represented according to Equation (1) as follows:

$$\begin{cases} Y = 1/4(R + 2G + B) \\ C_b = B - G \\ C_r = R - G \end{cases} \quad (1)$$

In some embodiments, the RCT may be represented according to Equation (2) as follows:

$$\begin{cases} Y = 0.299(R - G) + G + 0.114(B - G) \\ C_b = 0.564(B - Y) \\ C_r = 0.713(R - Y) \end{cases} \quad (2)$$

In Equation (1) and Equation (2), R, G, and B denote red, green, and blue color component of an RGB image, respectively; Y, $C_b$, and $C_r$ denote the transformed color component, respectively.

A forward transform unit may perform forward transform for each preprocessed image tile (504). The forward transform may include a two-dimensional (2D) discrete wavelet transform. The forward transform unit may be a filter bank that is a combination of at least one low-pass filter and at least one high-pass filter. The forward transform unit may perform the wavelet transform process for the input image data, and computes and outputs transform coefficients. The transform coefficients may be further quantized, and entropy encoded. A plurality of subbands may be generated after the wavelet transform process. Referring to FIG. 6, FIG. 6 illustrates exemplary subbands resulted from three times of wavelet transform according to some embodiments of the present disclosure. As shown in FIG. 6, an image tile 600 may be divided to 10 subbands resulted from three times of wavelet transform. It should be noted that "L" and "H" in FIG. 6 indicate low frequency and high frequency bands, respectively, and numerals next to "L" and "H" indicate transform times, respectively. For example, "LH-1" indicates a subband whose frequency goes lower in the horizontal (x) direction and higher in the vertical (y) direction which has a transform time "1."

As illustrated in FIG. 6, when the first wavelet transform process is performed, the image of the first layer may be generated to have subbands including LL-1, LH-1, HL-1, and HH-1. When the second wavelet transform process is performed, the image of the second layer may be generated. The second wavelet transform process may be performed only to the LL subband of the subbands of a layer obtained through the previous wavelet transform process. Therefore, the LL-1 subband of the image of first layer may be decomposed into four subbands, for example, LL-2, LH-2, HL-2, and HH-2. When the third wavelet transform process is performed, the image of the third layer may be generated. The third wavelet transform process may be performed only to the LL-2 subband of the image of the second layer. Therefore, the LL-2 subband of the image of second layer may be decomposed into four subbands, for example, LL-3, LH-3, HL-3, and HH-3. The LL-3 subband may show the lowest frequency component of the image tile 600.

After the wavelet transformation, the transform coefficients may be quantized using scalar quantization by the quantization unit (506). The scalar quantization operation may map a given input (e.g., a transform coefficient) to a quantization coefficient, which is then encoded as part of the compressed code stream. The quantization unit may map the transform coefficients to the quantization coefficients. In some embodiments, the scalar quantization may be represented according to Equation (3):

$$q = \text{sign}(y) \left\lfloor \frac{|y|}{\Delta_b} \right\rfloor, \quad (3)$$

where y is an input to the quantization unit 506, $\Delta_b$ is an quantization step size, q is a quantized value (or the quantization index), sign(y) denotes the sign of y, |y| denotes the absolute value of y, $$\left\lfloor \frac{|y|}{\Delta_b} \right\rfloor$$

denotes the largest integer that is no larger than the value of $$\frac{|y|}{\Delta_b}$$

For example, given that the input transform coefficient is −21.82, the quantization step is 10, then the quantization index is equal to $-\lfloor 21.82/10 \rfloor$, that is, −2.

Figure 7:
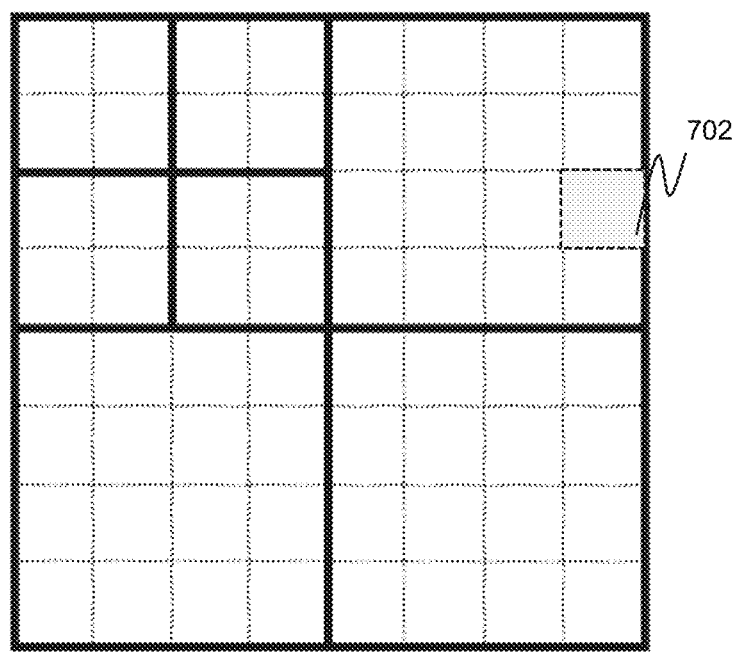
FIG. 7 is a schematic diagram illustrating exemplary code blocks according to some embodiments of the present disclosure.

In some embodiments, after the quantization, each subband may be divided into non-overlapping code blocks, which form the input of entropy encoding (508). Each code block may have a predetermined size, and be used as a unit for the entropy encoding. Referring to FIG. 7, FIG. 7 illustrates exemplary code blocks in the subbands. As shown in FIG. 7, a dotted rectangular block indicates a code block, for example, a code block 702. In JPEG 2000, normally, code blocks each having a size of 64×64, are generated in all subbands. For example, for a subband of 640×320 in size, there may exist a total of 50 code blocks each having a size of 64×64, where 10 code blocks in the horizontal direction, and 5 code blocks in the vertical direction. Each code block may be encoded independently, without reference to other code blocks.

The quantization coefficients corresponding to the code blocks may be entropy encoded by an entropy encoder unit (508). The entropy encoder unit may decompose the quantization coefficients in a code block into bit-planes, and an individual bit-plane is encoded in at least one encoding pass.

FIGS. 8A-8C illustrate an exemplary bit-plane decomposition process according to some embodiments of the present disclosure. As shown in FIG. 8A, given that reference numeral 802 denotes a code block including a total of 16 quantization coefficients, therein includes three non-zero coefficients, which respectively have values "+13," "−6," and "+3." Each non-zero coefficient may be represented as at least one binary-value variable. Reference numeral 804 denotes a schematic diagram illustrating binary-value variables of the non-zero coefficients. For example, the largest one of the absolute values of the 16 quantization coefficients is "13," which is "1101" in the binary notation. Therefore, the bit-planes of the absolute values of the coefficients include four bit-planes (e.g., 806, 808, 810 and 812), as shown in FIG. 8B. The four bit-planes may be arranged from the MSB 806 to the LSB 812. In some embodiments, a bit-plane corresponding to signs of the quantization coefficients may be generated. The quantization coefficients take "0" or positive values except for the quantization coefficients taking a negative value "−6." Therefore, the bit-plane of signs is as shown in FIG. 8C, that is, the bit-plane 814.

In JPEG 2000, EBCOT (Embedded Block Coding with Optimized Truncation) may be used to perform the entropy encoding process. The entropy encoding of quantization coefficients may be operated in the unit of code blocks. The code block may be encoded independently of each other in a direction from the most significant bit-plane (MSB) to the least significant bit-plane (LSB). As shown in FIG. 8B, the code block 802 may be decomposed to the bit-planes ranging from the MSB 806 to the LSB 812. The size of each bit-plane may be equal to the size of the code block, for example, 4×4 shown in FIGS. 8A-8C. Each bit-plane of a code block of a subband may be encoded sequentially along three types of encoding pass, which include a significance propagation pass (also referred to herein as SIG pass), a magnitude refinement pass (also referred to herein as REF pass), a cleanup pass (also referred to herein as CLN pass).

Every encoding pass may collect context information of the bit-plane data. The context information may be used by an arithmetic coder to generate a compressed bit stream.

The bit-planes may be encoded starting from the MSB to the LSB. The MSB is firstly encoded along the CLN pass. Noted that the encoding pass of the MSB is always the CLN pass. Then, other bit-planes excluding the MSB may be encoded sequentially along the SIG pass, REF pass, and the CLN in this order toward the LSB.

Figure 9:
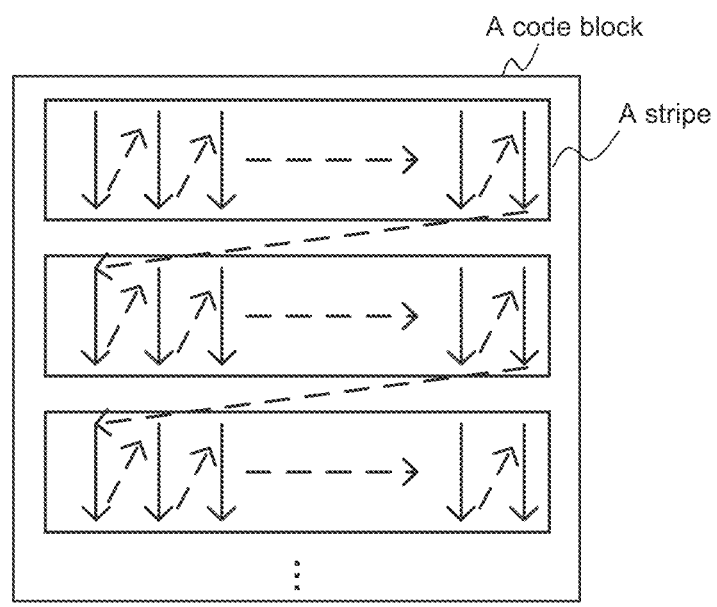
FIG. 9 is a schematic diagram illustrating an exemplary scan pattern of a bit-plane of a code block according to some embodiments of the present disclosure.

Each bit-plane of a code block may be scanned in a specific order. FIG. 9 illustrates an exemplary scan pattern of a bit-plane of a code block. As shown in FIG. 9, a code block 900 may be divided into stripes at every four vertical coefficient bits. Each of the stripes is as wide as the code block. The bits may be scanned in a sequence from a top stripe to a bottom stripe in a code block, in a sequence from a left row to a right row in each stripe and in a sequence from top to bottom in each row. The direction of an arrow shown in FIG. 9 indicates the scan sequence for bits of each bit-plane of a code block. Noted that all coefficient bits may be scanned in the above scan sequence along each encoding pass.

Each coefficient bit in the bit-plane may be encoded in only one of the three encoding passes (i.e., the SIG pass, the REF pass, the CLN pass). During the decoding for SIG pass, a coefficient bit may be encoded if it is not significant, but at least one of its eight-connect neighbors is significant. In some embodiments, a zero coding (ZC) and/or a sign coding (SC) may be applied to the bit-plane encoding along the SIG pass.

The term "significance" when used to describe a coefficient bit means a state that the coefficient bit has. The state may include significance or non-significance. The state of the coefficient bit may depend on its corresponding coefficient bits coded in previous bit-planes. A coefficient bit may be said to be significance if there is at least one non-zero coefficient bit among its corresponding coefficient bits coded in previous bit-planes. A coefficient bit that is not significant may be called non-significance. In some embodiments, an initial value of the "significance" of a coefficient bit is 0. When the first non-zero coefficient bit is encoded, the "significance" may have the value thereof changed to 1, which means the coefficient bit is "significant" and may remain "1" thereafter for corresponding coefficient bits in next bit-planes. For example, assuming that a quantization coefficient is "22," and its binary notation is "00010110," where the first bit "0" in the binary notation denotes the MSB, the last bit "0" denotes the LSB, and each binary value denotes a coefficient bit ranging from the MSB to the LSB. In this case, the coefficient bits are all "0" in value to the third bit-plane from the MSB, they are continuously "non-significant." However, when the fourth bit-plane whose coefficient bit has a value "1" is encoded, the bit state may change from "non-significant" to "significant." Subsequently, the bit state may remain to be "significant" whether the coefficient bits are "0" or "1" in value. The state corresponding to the quantization coefficient "00010110" may be represented as "00011111," where "0" means "non-significance," and "1" means "significance."

During the encoding for the REF pass, all coefficient bits that became significant in a previous bit-plane may be encoded. In some embodiments, a magnitude refinement coding (MRC) may be applied to the bit-plane encoding along the REF pass.

During the encoding for the CLN pass, all coefficient bits not encoded during the previous passes are encoded. In some embodiments, a zero coding (ZC), a sign coding (SC), and/or a run length coding (RLC) may be applied to the bit-plane encoding along the CLN pass.

Noted that, for different encoding passes, the zero coding, the sign coding, the magnitude refinement coding, or run length coding (RLC) may be selected to encode the coefficient bit, and output a decision and a context corresponding to the coefficient bit. Then the decision and the context may be encoded with an arithmetic coding (also referred to as "MQ coding"). The MQ coding is a learning-type binary arithmetic coding technique. More descriptions of the MQ coding may be found in, e.g., the document entitled "ISO/IEC FDIS 14492, Lossy/Lossless Coding of Bi-level Images, March 2000," etc. In JPEG 2000, a total of 19 types of contexts are defined for the three encoding passes. The 19 contexts may be represented as 0-18 (i.e., 0, 1, 2, . . . , 18).

After the entropy encoding, the source image data may be compressed as a code stream (510). The code stream may be stored as a file format in JPEG 2000. The code stream may be transmitted to the decoder arrangement for decoding. The decoding described in JPEG 2000 may be a mirror process of the encoding. For example, compressed data of each code block of the code stream may be entropy decoded (514). The entropy decoding may include an arithmetic decoding and a bit-plane decoding. An entropy decoder may execute the arithmetic decoding on the sequence of the data of each code block, and execute the bit-plane decoding to obtain each color component of the arithmetic decoded data in a bit-plane form. During the entropy decoding, the entropy decoder may decode by scanning bit-plane by bit-plane. For each bit-plane of a code block to be decoded, the entropy decoder may decode coefficient bits in the bit-plane along three decoding passes (e.g., the SIG pass, the REF pass, and the CLN pass). After the entropy decoding, an inverse quantization unit may perform an inverse quantization process for the input data (516). Then an inverse transform unit may perform an inverse wavelet transform for the inverse quantized data (518), and output the reconstructed image data. Noted that the decoding sequence may be in accordance with the encoding sequence.

Figure 10:
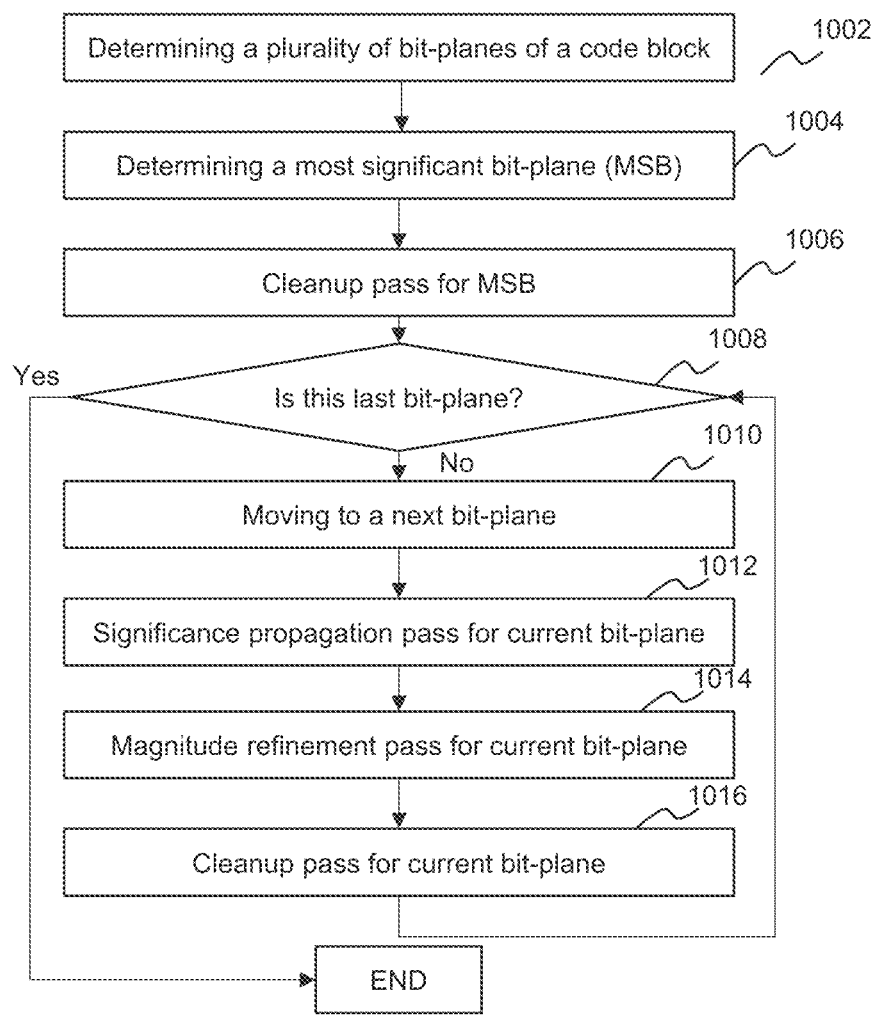
FIG. 10 is a flowchart illustrating an exemplary process for image encoding according to some embodiments of the present disclosure.

For easy understanding the decoding process, the encoding process may be described as FIG. 10. FIG. 10 is a flowchart illustrating an exemplary process for image encoding according to some embodiments of the present disclosure. As described above, each code block may be encoded independently without reference to other blocks. Merely for illustration, process 1000 illustrated in FIG. 10 may be used to encode each code block of an image. In some embodiments, the process 1000 may be implemented on the image processing system 110. For example, the process 1000 may be stored in the storage device 130, and/or an internal storage medium (e.g., a memory, a ROM) of the image processing system in the form of instructions, and invoked and/or executed by at least one processor in the image processing system 110.

Before operation 1002, some parameters may be initialized. For example, a significance table may be generated and initialized. The significance table may include a two-dimensional array of significance states of the coefficient bits of the code block to be encoded. In some embodiments, the size of the significance table may be equal to the size of the code block. All elements of the array may be initialized as "0" indicating each coefficient bit has an insignificance state. The significance state of a coefficient bit may be changed to "1" when the coefficient's first non-zero bit-plane value is encoded and the corresponding element of the array is reset to "1." The significance table may be updated during the encoding passes. In some embodiments, the significance table may be stored and updated by a state register implemented on the image encoding engine 230.

As another example, during the initialization, a significance propagation list (also referred to herein as SIG list), a magnitude refinement list (also referred to herein as REF list), and a cleanup list (also referred to herein as CLN list) may be generated and initialized. The lists may include positions of the coefficient bits of the code block to be encoded during the current passes. For example, the SIG list includes a list of positions of the coefficient bits of the code block that are to be encoded along the SIG pass. As used herein, the position of the coefficient bit may refer to the array position of the coefficient in a bit-plane of the code block. For example, a position of the coefficient bit is indicated as S[i,j], where i denotes a position in the horizontal direction of the bit-plane, and j denotes a position in the vertical direction of the bit-plane. In some embodiments, the positions within the lists may be indexed according to the scan sequence in the code block (e.g., the scan sequence illustrated in FIG. 9). Initially, the SIG list and REF list may be empty, while the CLN list indicates all the positions within the code block, and is used for the encoding of the MSB having a non-zero bit.

In 1002, the processor (e.g., the image encoding engine 230 of the image processing system 110) may determine a plurality of bit-planes of a code block.

In some embodiments, the image encoding engine 230 may obtain transform coefficients of the code block, and divide the transform coefficients into the plurality of bit-planes. The plurality of bit-planes may range from the most significant bit-plane (MSB) to the least significant bit-plane (LSB), as shown in FIGS. 8A-8C. The transform coefficients may be generated by a two-dimensional discrete wavelet transform (2D DWT). Specifically, the image data acquisition engine 210 may obtain source image data (e.g., a greyscale image, or an RGB image). The source image data may be preprocessed by the image preprocessing engine 220. The preprocessing process may include the image tiling, DC level shifting, and/or color transform. Then the image encoding engine 230 may perform the 2D DWT for the preprocessed image data, and obtain corresponding wavelet transform coefficients. After the 2D DWT, each image tile may be divided into a plurality of subbands, as illustrated in FIG. 6. Each subband may be further divided into a plurality of code blocks in a specific size (e.g., 64×64). The image encoding engine 230 may further divide the transform coefficients of the code block into the bit-planes ranging from the MSB to the LSB. Each bit-plane may include an array of coefficient bits represented by a binary notation.

In 1004, the processor (e.g., the image encoding engine 230 of the image processing system 110) may determine the most significant bit-plane (MSB). As shown in FIG. 8B, the image encoding engine 230 may determine the MSB 806 corresponding to the code block 802.

In 1006, the processor (e.g., the image encoding engine 230 of the image processing system 110) may perform the entropy encoding along the cleanup pass. In JPEG 2000, the MSB may be entropy encoded only along the cleanup pass. Specifically, all non-zero coefficient bits in the MSB may be entropy encoded. The non-zero coefficient bits may be entropy encoded in a predetermined scan pattern/sequence, for example, the scan pattern as illustrated in FIG. 9. In some embodiments, the image encoding engine 230 may select a zero coding (ZC), and/or a sign coding (SC) to encode the coefficient bits. After the encoding, the image encoding engine 230 may output a decision (0 or 1) and a context. Then the decision and the context may be further entropy encoded with an arithmetic coding method as described in JPEG 2000.

In some embodiments, during encoding for the cleanup pass, the SIG list and the REF list may be updated. For example, when a first coefficient bit is found to be significant, the position of the first coefficient bit may be added to the current REF list. As another example, when a second coefficient bit is found to be non-significant, but at least one of its neighbors (e.g., eight neighbors) is found to be significant, the position of the second coefficient may be added to the current SIG list. As used herein, a neighbor of a specific coefficient bit may refer to a coefficient bit adjacent to the specific coefficient. For example, for an array $$\begin{bmatrix} A0 & A3 & A6 \\ A1 & A4 & A7 \\ A2 & A5 & A8 \end{bmatrix},$$

the eight neighbors of the coefficient bit A4 are A0, A1, A2, A3, A5, A6, A7, and A8.

In 1008, the processor (e.g., the image encoding engine 230 of the image processing system 110) may determine whether or not the current encoding bit-plane is the last bit-plane. If the current encoding bit-plane is the last bit-plane, the processor may terminate the encoding process of the code block. If the current encoding bit-plane is not the last bit-plane, the processor may proceed to operation 1010.

In 1010, the processor (e.g., the image encoding engine 230 of the image processing system 110) may move to the next bit-plane to be encoded. For example, as shown in FIG. 8B, after the encoding of the MSB for the cleanup pass, the bit-plane 808 becomes the next bit-plane to be encoded in sequence. The image encoding engine 230 may obtain information regarding the coefficient bits of the next bit-plane (e.g., the bit-plane 808 being the next bit-plane of the bit-plane 806).

In 1012, the processor (e.g., the image encoding engine 230 of the image processing system 110) may perform the entropy encoding for a current bit-plane along the significance propagation pass. The coefficient bits in the current bit-plane corresponding to the positions in the current SIG list may be entropy encoded. In some embodiments, the image encoding engine 230 may select ZC, and/or SC to encode the coefficient bits in the current bit-plane. After the encoding, the image encoding engine 230 may output the decision and the context. Then the decision and the context may be further entropy encoded with the arithmetic coding algorithm as described in JPEG 2000. In some embodiments, during the encoding for the SIG pass, when a first coefficient bit is found to be significant, the image encoding engine 230 may add the position of the first coefficient bit to a new REF list, after the encoding for the cleanup pass (i.e., operation 1016), the new REF list may be merged with the current REF list. As used herein, merging two REF lists may be achieved by replacing the null element(s) in the current REF list with the corresponding element(s) that is/are not null in the new REF list. For example, assuming that the new REF list includes $$\begin{bmatrix} null & 1 & null \\ 1 & null & 1 \\ null & null & null \end{bmatrix},$$

the current REF list includes $$\begin{bmatrix} null & 1 & null \\ null & null & null \\ null & 1 & null \end{bmatrix},$$

where null stands for its corresponding element is empty (i.e., corresponding coefficient bit need not be encoded), "1" stands for corresponding coefficient bit to be encoded, then the merged REF list includes $$\begin{bmatrix} null & 1 & null \\ 1 & null & 1 \\ null & 1 & null \end{bmatrix}.$$

In some embodiments, during the encoding for the SIG pass, if the first coefficient bit is found to be significant, the image encoding engine 230 may determine eight neighbors of the first coefficient bit, and obtain the position(s) of the neighbor(s) that have a non-significance state. In some embodiments, if there is one or more positions of the non-significant coefficient bits that are prior to the position of the first coefficient bit in the scan sequence, the image encoding engine 230 may add these positions to a new SIG list. As used herein, the position of a first coefficient bit may be described as prior to the position of a second coefficient bit if the first coefficient bit is scanned and entropy encoded prior to the second coefficient bit. If there are one or more positions of the non-significant coefficient bits that are after the position of the first coefficient bit in the scan sequence, the image encoding engine 230 may add these positions to the current SIG list, and update the current SIG list. As used herein, the position of a first coefficient bit may be described as after the position of a second coefficient bit if the first coefficient bit is scanned and entropy encoded later than the second coefficient bit. The image encoding engine 230 may encode the coefficient bits corresponding to the positions in the updated SIG list. In some embodiments, during the encoding for the SIG pass, the image encoding engine 230 may determine the CLN list based on the updated SIG list and the current REF list. For example, the CLN list may include the positions of the coefficient bits that exclude the coefficient bits included in the updated SIG list and the current REF list.

After completion of encoding for the SIG pass, in 1014, the processor (e.g., the image encoding engine 230 of the image processing system 110) may perform the entropy encoding for the current bit-plane along the magnitude propagation pass. The coefficient bits in the current bit-plane corresponding to the positions in the current REF list may be entropy encoded. In some embodiments, the image encoding engine 230 may select MRC to encode the coefficient bits. After the encoding, the image encoding engine 230 may output the decision and the context. Then the decision and the context may be further entropy encoded with the arithmetic coding algorithm as described in JPEG 2000.

After completion of encoding for the REF pass, in 1016, the processor (e.g., the image encoding engine 230 of the image processing system 110) may perform the entropy encoding for the current bit-plane along the cleanup pass. The coefficient bits in the current bit-plane corresponding to the positions in the current CLN list may be entropy encoded. In some embodiments, during the encoding for the cleanup pass, when a first coefficient bit is found to be significant, its position may be added to the new REF list (generated during the previous SIG pass illustrated in 1012). In some embodiments, the image encoding engine 230 may determine eight neighbors of the first coefficient bit, and obtain the position(s) of the neighbor(s) that have a non-significance state. The image encoding engine 230 may add these positions of the non-significant neighbors to the new SIG list (generated during the previous SIG pass illustrated in 1012). The new SIG list may be merged with the current SIG list. The new REF list may be merged with the current REF list. The merging two SIG lists is similar to the merging two REF lists as described above. In some embodiments, the merged SIG list and REF list may be reused for the encoding of the current bit-plane.

The process 1000 may be just one encoding technique for the image encoding provided for illustration purposes and not intended to be limiting. Those skilled in the art would understand that other image encoding techniques may be applied to the image encoding engine 230. For example, the encoding technique may also include Huffman coding, Shannon coding, range coding, or the like, or any combination thereof.

It should be understood that, during either the encoding or decoding, the process order are substantially the same. The decoding process mirrors the encoding process (e.g., the process 1000). During the entropy decoding, each bit-plane of a code block may need to be entropy decoded along at least one pass (e.g., the SIG pass, the REF pass, and/or the CLN pass). The MSB may be only decoded along the CLN pass. The other bit-planes may be decoded along the SIG pass, the REF pass, and the CLN pass in sequence. In JPEG 2000, each of the other bit-planes may be scanned three times. However, for each decoding pass, the image decoding engine 240 may need to scan over all the positions, and determine whether or not the coefficient bits have been decoded in the current pass. Obviously, it is a waste of time to scan over positions that need not be decoded.

Figure 11:
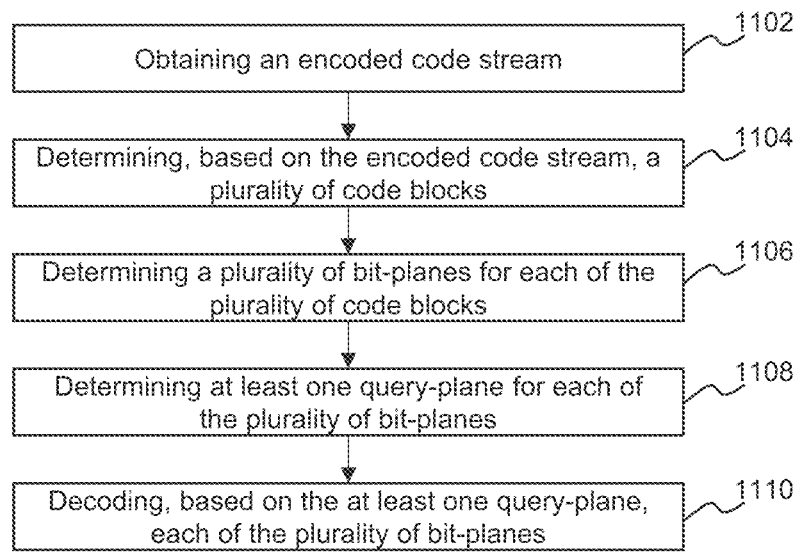
FIG. 11 is a flowchart illustrating an exemplary process for image decoding according to some embodiments of the present disclosure.

To resolve the above-identified issues and other issues, process 1100 illustrated in FIG. 11 is provided in the present disclosure. FIG. 11 is a flowchart illustrating an exemplary process for image decoding according to some embodiments of the present disclosure. In some embodiments, the process 1100 may be implemented on the image processing system 110. For example, the process 1100 may be stored in the storage device 130, and/or an internal storage medium (e.g., a memory, a ROM) of the image processing system in the form of instructions, and invoked and/or executed by at least one processor in the image processing system 110.

In 1102, the processor (e.g., the code stream obtaining module 310 of the image decoding engine 240) may obtain an encoded code stream.

As described in connection with FIG. 5, the source image data may be compressed as the code stream through the encoding process. The encoding process may include the preprocessing, the forward transform, the quantization, and the entropy encoding. After the entropy encoding, the code blocks associated with the source image data may be encoded as the code stream. The encoded code stream may be stored in a storage device (e.g., the storage device 130), and/or transmitted to the image decoding engine 240. For those skilled in the art, the encoding process may be referred in connection with the JPEG 2000 standardized by ISO. More descriptions about the encoding may also be found elsewhere in the present disclosure (e.g., FIG. 5 or FIG. 10, and the description thereof), and not repeat herein.

In some embodiments, the code stream obtaining module 310 may obtain the encoded code stream corresponding to the source image data from an encoder (e.g., the image encoding engine 230). In some embodiments, the code stream obtaining module 310 may retrieve the code stream to be decoded from a storage device (e.g., the storage device 130). The code stream may indicate information regarding a plurality of code blocks of each image tile of the source image. In some embodiments, the code stream may include a main header, and a plurality of tile streams corresponding to the main header. The tile stream may indicate information of the image tile. A tile stream may include a tile header, and a packet stream corresponding to the tile header. The packet stream may indicate information of the packets included in the image tile. A packet may include a packet header, and compressed data corresponding to the packet header. In some embodiments, the packet may include one or more code blocks. Therefore, the compressed data in the packet may indicate encoded data corresponding to the one or more code blocks.

In 1104, the processor (e.g., the code block determination module 320 of the image decoding engine 240) may determine a plurality of code blocks based on the obtained code stream.

In some embodiments, the code block determination module 320 may obtain compressed data of the plurality of code blocks by parsing the code stream. For example, the code block determination module 320 may obtain a packet header, and determine the packet indicated by the packet header. The code block determination module 320 may further determine a plurality of code blocks included in the packet, and obtain compressed data corresponding to the plurality of code blocks.

In 1106, the processor (e.g., the bit-plane determination module 330 of the image decoding engine 240) may determine a plurality of bit-planes for each of the plurality of code blocks.

In some embodiments, the bit-plane determination module 330 may further parse the plurality of packets to determine the plurality of bit-planes corresponding to the code block. In JPEG 2000, the encoded data for each bit-plane of a code block may be organized in the code stream in order. For example, a bit-plane corresponds to a unique header. The bit-plane determination module 330 may be easy to identify the plurality of bit-planes by indexing the unique headers.

In 1108, the processor (e.g., the query-plane determination module 340 of the image decoding engine 240) may determine at least one query-plane for each of the plurality of bit-planes. As used herein, the query-plane may include a two-dimensional array of positions of the coefficient bits of the bit-plane to be decoded during the current decoding pass. The decoding pass may include a significance propagation pass, a magnitude refinement pass, or a cleanup pass.

The size of the query-plane may be equal to the size of the bit-plane or the code block. For example, assuming that the code block is 64×64 in size, the query-plane may also be 64×64 in size. The position of each element in the query-plane may correspond to the position of each coefficient bit in the bit-plane. In some embodiments, the query-plane may indicate the coefficient bits to be decoded. In the query-plane, a binary-value variable of the element may be used to indicate whether or not a coefficient bit needs to be decoded. For example, assuming that $q[i, j]$ denotes an element of the query-plane, where i denotes a position in the horizontal direction of the query-plane, j denotes a position in the vertical direction of the query-plane. If the value of the element $q[i, j]$ is 1, which means the coefficient bit corresponding to the $q[i, j]$ may need to be decoded. As another example, if the value of the element $q[i, j]$ is 0, which means the coefficient bit corresponding to the $q[i, j]$ may not need to be decoded.

During the decoding, a code block may be decoded independently, without reference to other code blocks. The bit-planes of the code block may need to be decoded from the most significance plane (MSB) to the least significance plane (LSB). In some embodiments, a coefficient bit of the bit-plane needs to be decoded in one and only one of the three decoding passes. In some embodiments, for a bit-plane, the query-plane determination module 340 may determine a query-plane along the current decoding pass. For example, the first query-plane determination unit 402 may determine a first query-plane corresponding to the significance propagation pass. As another example, the second query-plane determination unit 404 may determine a second query-plane corresponding to the magnitude refinement pass. As a still example, the third query-plane determination unit 406 may determine a third query-plane corresponding to the cleanup pass. More descriptions about determining the query-planes may be referred in connection with FIGS. 12-14 and the descriptions thereof.

In some embodiments, the first query-plane determination unit 402 may determine the first query-plane based on a first significance-plane and a first undecoded-plane. The first query-plane may indicate first coefficient bits to be decoded along the significance propagation pass. For example, the searching module 350 may search the coefficient bits having a value of "1" in the first query-plane, and designate these coefficient bits as the first coefficient bits to be decoded along the significance propagation pass.

As used herein, the significance-plane may include a two-dimensional array of significance states of the coefficient bits of the code block to be decoded. In some embodiments, all elements of the significance-plane may be initialized as "0" indicative of each coefficient bit having the insignificance state. During the decoding process, if the coefficient bit is found to be significant, its corresponding significance state may be changed to "1."

As used herein, the undecoded-plane may include a two-dimensional array of decoding states of the coefficient bits of the code block. In the undecoded-plane, all elements of the array may be initialized as "1" indicative of each coefficient bit having not been decoded (i.e., an undecoded state). If the coefficient bit has been decoded, its corresponding element may be reset to "0." In other words, in the undecoded-plane, if the value of the element is "0," which means the coefficient bit, corresponding to the element, has been decoded. If the value of the element is "1," which means the coefficient bit, corresponding to the element, has not been decoded, and needs to be decoded.

Referring to FIG. 12, FIG. 12 illustrates an exemplary process for determining the first query-plane corresponding to a significance propagation pass according to some embodiments of the present disclosure. In process 1200, reference numeral 1202 denotes the first significance-plane corresponding to a current bit-plane to be decoded. Reference numeral 1204 denotes the first undecoded-plane corresponding to the current bit-plane. Reference numeral 1206 denotes the first query-plane corresponding to the current bit-plane. In some embodiments, the first query-plane determination unit 402 may determine the first query-plane 1206 by performing logic operations for the first significance-plane 1202 and the first undecoded-plane 1204. The logic operations may include an OR operation, a NOT operation, and an AND operation.

For example, assuming that a binary-value variable $s_k[i,j]$ denotes a significance state of a coefficient bit X[i,j], the significance states of the eight neighbors of the coefficient bit X[i,j] may be denoted as $$\begin{bmatrix} s_k[i-1, j-1] & s_k[i-1, j] & s_k[i-1, j+1] \\ s_k[i, j-1] & s_k[i, j] & s_k[i, j+1] \\ s_k[i+1, j-1] & s_k[i+1, j] & s_k[i+1, j+1] \end{bmatrix},$$

where $s_k[\bullet]$ denotes the significance state immediately prior to the decoding of the coefficient bit X[i,j]. As illustrated in FIG. 12, in the first significance-plane 1202, the first query-plane determination unit 402 may perform the NOT operation for $s_k[i,j]$ to determine a first value. The first query-plane determination unit 402 may perform the OR operation for the eight neighbors of the $s_k[i,j]$ to determine a second value. The first query-plane determination unit 402 may perform the AND operation for the first value and the second value to determine a third value. Assuming that a binary-value variable $u_k[i,j]$ denotes a decoding state of the coefficient bit X[i,j] in the undecoded-plane 1204. The first query-plane determination unit 402 may perform the AND operation for the third value and $u_k[i,j]$ to determine a fourth value. The fourth value may be reset to a binary-value variable of $q_k[i,j]$ in the first query-plane 1206. If $q_k[i,j]$ is equal to "0," which means the coefficient bit X[i,j] need not be decoded along the significance propagation pass. If $q_k[i, j]$ is equal to "1," which means the coefficient bit X[i,j] need be decoded along the significance propagation pass.

It should be understood that, during the decoding along the significance propagation pass, the first significance-plane and the first undecoded-plane may be updated. The first query-plane may also be updated based on the updated first significance-plane and the updated first undecoded-plane accordingly. In some embodiments, the first query-plane determination unit 402 may obtain a preliminary first significance-plane (S1) and a preliminary first undecoded-plane (U1) based on entropy decoding result of a previous bit-plane. For example, assuming that the entropy decoding result of the previous bit-plane is represented as an array $$\begin{bmatrix} 1 & \ldots & 0 \\ 0 & \ldots & 0 \\ 0 & \ldots & 1 \end{bmatrix},$$

where each element of the array denotes a decision output by the image decoding engine 240. Then the preliminary first significance-plane S1 may be represented as $$\begin{bmatrix} 1 & \ldots & 0 \\ 0 & \ldots & 0 \\ 0 & \ldots & 1 \end{bmatrix},$$

the preliminary first undecoded-plane U1 may be represented as $$\begin{bmatrix} 1 & \ldots & 1 \\ 1 & \ldots & 1 \\ 1 & \ldots & 1 \end{bmatrix}.$$

In some embodiments, during the decoding along the significance propagation pass, if a coefficient bit has been decoded, its corresponding element in U1 may be reset to 0, U1 may be updated accordingly. If a decoded decision of the coefficient bit is 1, its corresponding element in S1 may be reset to 1, S1 may be updated accordingly. After completion of the decoding along the significance propagation pass, the first significance-plane may be updated as S2, the first undecoded-plane may be updated as U2.

In some embodiments, the second query-plane determination unit 404 may determine the second query-plane based on a second significance-plane and a second undecoded-plane. The second query-plane may indicate second coefficient bits to be decoded along the magnitude refinement pass. For example, the searching module 350 may search the coefficient bits having a value of "1" in the second query-plane, and designate these coefficient bits as the second coefficient bits to be decoded along the magnitude refinement pass.

Referring to FIG. 13, FIG. 13 illustrates an exemplary process for determining the second query-plane corresponding to a magnitude refinement pass according to some embodiments of the present disclosure. In process 1300, reference numeral 1302 denotes the second significance-plane corresponding to the current bit-plane to be decoded. Reference numeral 1304 denotes the second undecoded-plane corresponding to the current bit-plane. Reference numeral 1306 denotes the second query-plane corresponding to the current bit-plane. In some embodiments, the second query-plane determination unit 404 may determine the second query-plane 1306 by performing logic operations (e.g., an AND operation, an OR operation, a NOT operation) for the second significance-plane 1302 and the second undecoded-plane 1304.

For example, assuming that a binary-value variable $s_k[i,j]$ denotes a significance state of a coefficient bit X[i,j] in the second significance-plane 1302, and a binary-value variable $u_k[i,j]$ denotes a decoding state of the coefficient bit X[i,j] in the second undecoded-plane 1304. As illustrated in FIG. 13, the second query-plane determination unit 404 may perform the AND operation for $s_k[i,j]$ and $u_k[i,j]$ to determine a value. The value may be reset to a binary-value variable of $q_k[i, j]$ in the second query-plane 1306. If $q_k[i, j]$ is equal to "0", which means the coefficient bit X[i,j] need not be decoded along the magnitude refinement pass. If $q_k[i,j]$ is equal to "1," which means the coefficient bit X[i,j] need be decoded along the magnitude refinement pass.

In some embodiments, the second query-plane determination unit 404 may obtain a second significance-plane based on the entropy decoding result of the previous bit-plane. For example, assuming that the entropy decoding result of the previous bit-plane is represented as an array $$\begin{bmatrix} 1 & \ldots & 0 \\ 0 & \ldots & 0 \\ 0 & \ldots & 1 \end{bmatrix},$$

where each element of the array denotes a decision output by the image decoding engine 240. Then the second significance-plane may be represented as $$\begin{bmatrix} 1 & \ldots & 0 \\ 0 & \ldots & 0 \\ 0 & \ldots & 1 \end{bmatrix}.$$

In other words, the second significance-plane may be the same as the preliminary first significance-plane (S1). It should be noted that, during the decoding along the magnitude refinement pass, the second significance-plane may remain unchanged, which is different from the first significance-plane. The second significance-plane may only depend on the entropy decoding result of the previous bit-plane.

In some embodiments, the second query-plane determination unit 404 may obtain a preliminary second undecoded-plane. The preliminary second undecoded-plane may be the same as U2. During the decoding along the magnitude refinement pass, if a coefficient bit has been decoded, its corresponding element in U2 may be reset to 0, U2 may be updated accordingly. After completion of the decoding along the magnitude refinement pass, the second undecoded-plane may be updated as U3.

In some embodiments, the third query-plane determination unit 406 may determine the third query-plane based on a third undecoded-plane. The third query-plane may indicate third coefficient bits to be decoded along the cleanup pass. For example, the searching module 350 may search the coefficient bits having a value of "1" in the third query-plane, and designate these coefficient bits to be decoded along the cleanup pass.

Referring to FIG. 14, FIG. 14 illustrates an exemplary process for determining the third query-plane corresponding to a cleanup pass according to some embodiments of the present disclosure. In process 1400, reference numeral 1402 denotes the third undecoded-plane corresponding to the current bit-plane. Reference numeral 1404 denotes the third query-plane corresponding to the current bit-plane. As illustrated in FIG. 14, the third query-plane determination unit 406 may designate the third undecoded-plane 1402 as the third query-plane 1404. It is understood that the third undecoded-plane 1420 and the third query-plane may be the same as U3.

Returning to FIG. 11, in 1110, the processor (e.g., the decoding module 360 of the image decoding engine 240) may decode each of the plurality of bit-planes based on the at least one query-plane.

In some embodiments, the decoding module 360 may decode the plurality of bit-planes ranging from the MSB to the LSB in sequence. The decoding module 360 may decode each bit-plane along a decoding pass (e.g., the significance propagation pass, the magnitude refinement pass, or the cleanup pass).

In some embodiments, the decoding module 360 may firstly decode the MSB only along the cleanup pass. The decoding module 360 may decode the MSB based on the query-plane corresponding to the cleanup pass (e.g., the third query-plane). Because the MSB is the first bit-plane to be decoded, all coefficient bits of the MSB may need to be decoded. Therefore, each element of the current third query-plane may be reset to 1, which means each coefficient bit needs to be decoded. In some embodiments, the decoding module 360 may select a decoding technique, for example, zero decoding (ZD), sign decoding (SD), or run length decoding (RLD), to decode the coefficient bits. In some embodiments, the searching module 350 may search, according to a searching algorithm, the coefficient bits to be decoded in the query-plane corresponding to the cleanup pass. The searching algorithm may include but not limited to a sequential search algorithm, a binary search algorithm, an interpolation search algorithm, a binary hash search algorithm, a binary search tree algorithm, or a Fibonacci search algorithm. The searching module 350 may search the coefficient bits having a value "1" in the current query-plane, and transmit positions of these coefficient bits to the decoding module 360. The decoding module 360 may further entropy decode the coefficient bits corresponding to the positions.

In some embodiments, the decoding module 360 may decode the other bit-planes of the plurality of bit-planes excluding the MSB along at least one of the significance propagation pass, the magnitude refinement pass, or the cleanup pass. For example, the decoding module 360 may firstly decode first coefficient bits of the bit-plane along the significance propagation pass, then decode second coefficient bits of the bit-plane along the magnitude refinement pass, and decode third coefficient bits of the bit-plane along the cleanup pass.

During the decoding for the significance propagation pass, the decoding module 360 may select ZD or SD to decode the first coefficient bits. The first coefficient bits may correspond to the elements having the value "1" in the first query-plane. The searching module 350 may search the elements having the value "1," and transmit positions of these elements to the decoding module 360. The decoding module 360 may further decode the first coefficient bits corresponding to the positions.

Those skilled in the art would understand, in the conventional JPEG 2000, the bit-plane decoding is performed bit-plane by bit-plane. For each bit-plane, bit by bit may be scanned according to a scan pattern, e.g., the scan pattern illustrated in FIG. 9. A next coefficient bit may be allowed to decode as long as a current coefficient bit has been decoded. It is a waste of time that a waiting period may exist between two decoding operations for the current coefficient bit and the next coefficient bit. To resolve this and other issues, the decoding module 360 may decode at least two coefficient bits in parallel during the significance propagation pass. For example, the decoding module 360 may predict a decision regarding a current decoding coefficient bit. In most cases, because it is a high probability that the decision of the coefficient bit is 0, the decoding module 360 may always predict that the decision of the current decoding coefficient bit is 0. In response to the decision regarding the current coefficient bit, the decoding module 360 may perform the decoding for the next coefficient bit at the same time.

During the decoding for the magnitude refinement pass, the decoding module 360 may select MRD to decode the second coefficient bits. The second coefficient bits may correspond to the elements having the value "1" in the second query-plane. The searching module 350 may search the elements having the value "1," and transmit positions of these elements to the decoding module 360. The decoding module 360 may further decode the second coefficient bits corresponding to the positions.

During the decoding for the cleanup pass, the decoding module 360 may select ZD, SD, or RLD, to decode the third coefficient bits. The third coefficient bits may correspond to the elements having the value "1" in the third query-plane. The searching module 350 may search the elements having the value "1," and transmit positions of these elements to the decoding module 360. The decoding module 360 may further decode the third coefficient bits corresponding to the positions.

In some embodiments, the searching module 350 may search the elements having the value "1" in the first query-plane, the second query-plane and/or the third query-plane according to the same searching algorithm. In some embodiments, the searching module 350 may search the elements having the value "1" in the first query-plane, the second query-plane and/or the third query-plane according to an individual searching algorithm, respectively. For example, the searching module 350 may search the first query-plane according to a first searching algorithm. The searching module 350 may search the second query-plane according to a second searching algorithm. The searching module 350 may search the third query-plane according to a third searching algorithm. In some embodiments, the first searching algorithm, the second searching algorithm, and/or the third searching algorithm may include at least one of a sequential search algorithm, a binary search algorithm, an interpolation search algorithm, a binary hash search algorithm, a binary search tree algorithm, or a Fibonacci search algorithm. Those skilled in the art would understand that the searching algorithm may be varied and such variations are within the protection scope of the present disclosure. More descriptions about the decoding may be found elsewhere in the present disclosure (e.g., FIGS. 15A-15C, and the descriptions thereof).

It should be noted that, the description above is only for illustration purposes, and is not intended to limit the scope of the present application. It should be understood that, after understanding the principle of the system, those skilled in the art may make any modification or transformation to the form and details of implementation of the above methods and application of the system, in the case of not deviate from the principle. For example, operations 1104 and 1106 may be integrated into a single operation.

Figure 15A:
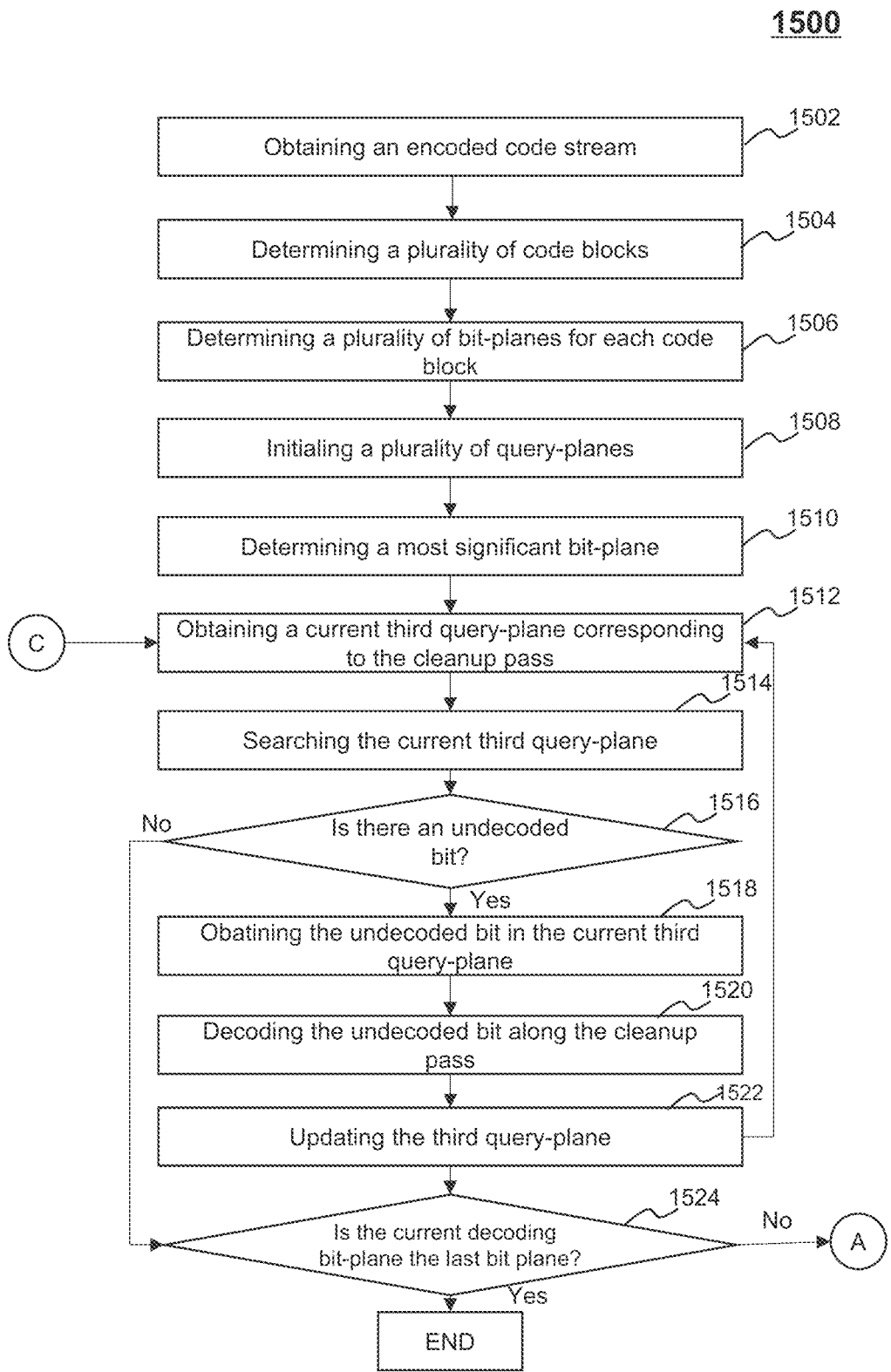
FIGS. 15A-15C are schematic diagrams illustrating exemplary processes for image decoding according to some embodiments of the present disclosure.
Figure 15B:
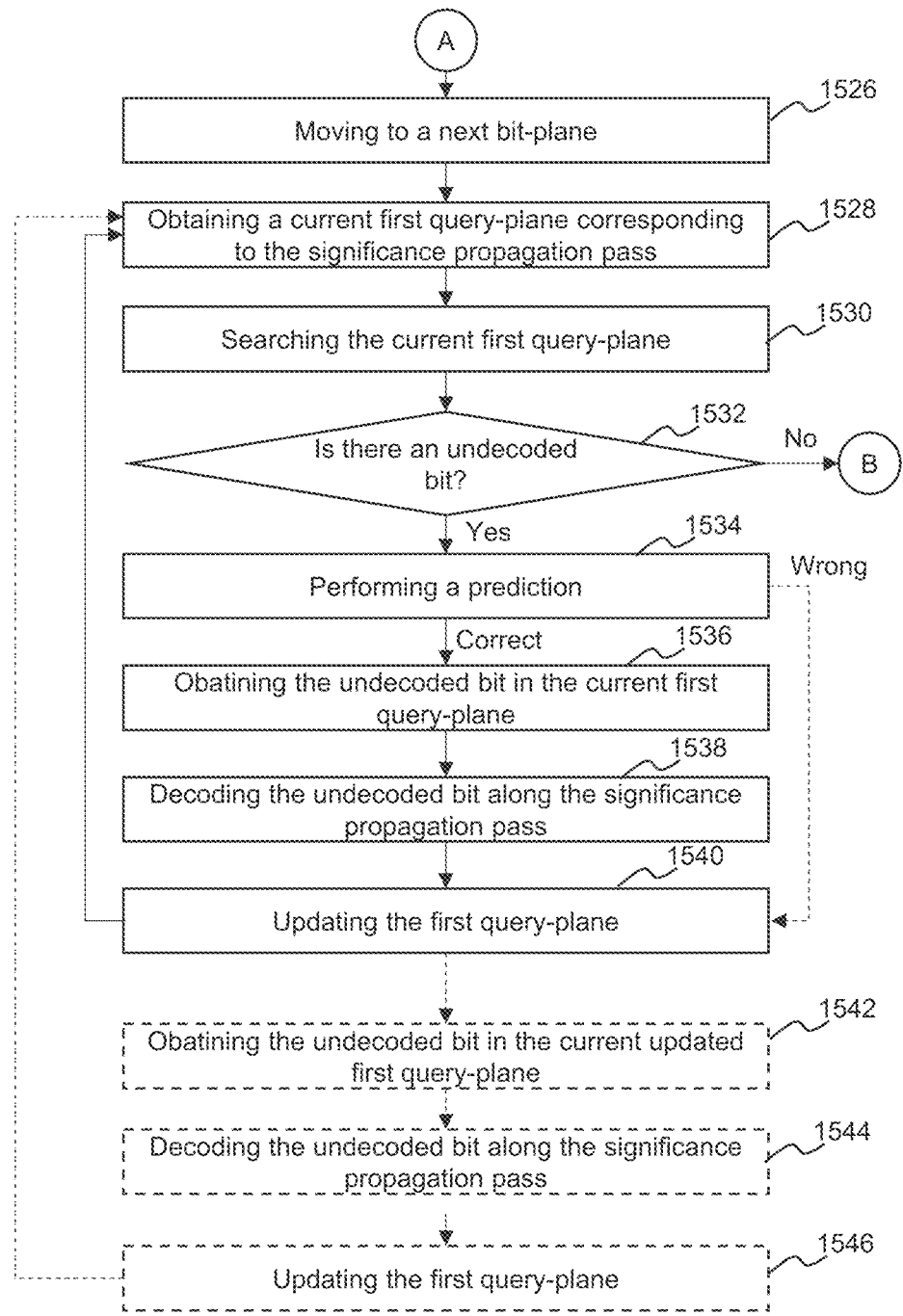
Figure 15C:
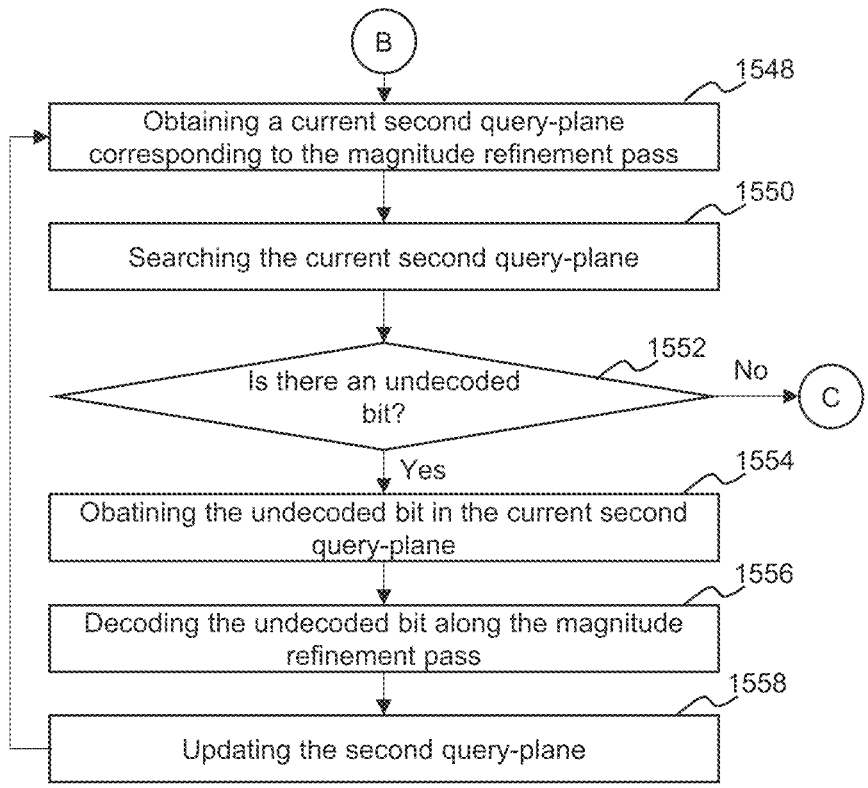

FIGS. 15A-15C are schematic diagrams illustrating exemplary processes for image decoding according to some embodiments of the present disclosure. In some embodiments, the process 1500 may be implemented on the image processing system 110. For example, the process 1500 may be stored in the storage device 130, and/or an internal storage medium (e.g., a memory, a ROM) of the image processing system in the form of instructions, and invoked and/or executed by at least one processor in the image processing system 110.

In 1502, the processor (e.g., e.g., the code stream obtaining module 310 of the image decoding engine 240) may obtain an encoded code stream.

As illustrated in FIG. 5, the source image data may be compressed as the code stream through the encoding process. The encoding process may include the preprocessing, the forward transform, the quantization, and the entropy encoding. After the entropy encoding, the code blocks associated with the source image data may be encoded as the code stream. The encoded code stream may be stored in a storage device (e.g., the storage device 130), and/or transmitted to the image decoding engine 240. For those skilled in the art, the encoding process may be referred in connection with the JPEG 2000 standardized by ISO. More descriptions about the encoding may also be found elsewhere in the present disclosure (e.g., FIG. 5 or FIG. 10, and the description thereof), and not repeat herein.

The code stream may include information regarding a plurality of code blocks of each image tile of the source image. In some embodiments, the code stream may include a main header, and a plurality of tile streams corresponding to the main header. The tile stream may include information of the image tile. For instance, a tile stream may include a tile header, and a packet stream corresponding to the tile header. The packet stream may indicate information of the packets included in the image tile. A packet may include a packet header, and compressed data corresponding to the packet header. In some embodiments, the packet may include one or more code blocks. Therefore, the compressed data in the packet may indicate encoded data corresponding to the one or more code blocks.

In 1504, the processor (e.g., the code block determination module 320 of the image decoding engine 240) may determine a plurality of code blocks based on the obtained code stream.

In some embodiments, the code block determination module 320 may obtain compressed data of the plurality of code blocks by parsing the code stream. For example, the code block determination module 320 may obtain a packet header, and determine the packet indicated by the packet header. The code block determination module 320 may further determine a plurality of code blocks included in the packet, and obtain compressed data corresponding to the plurality of code blocks.

In 1506, the processor (e.g., the bit-plane determination module 330 of the image decoding engine 240) may determine a plurality of bit-planes for each of the plurality of code blocks.

In some embodiments, the bit-plane determination module 330 may further parse the plurality of packets to determine the plurality of bit-planes corresponding to the code block. In JPEG 2000, the encoded data for each bit-plane of a code block may be organized in the code stream in order. For example, a bit-plane corresponds to a unique header. The bit-plane determination module 330 may be easy to identify the plurality of bit-planes by indexing the unique headers.

In 1508, the processor (e.g., the query-plane determination module 340 of the image decoding engine 240) may initialize a plurality of query-planes.

As used herein, the query-plane may include a two-dimensional array of positions of the coefficient bits of the bit-plane to be decoded during a current decoding pass. The plurality of query-planes may include a first query-plane corresponding to the significance propagation pass (e.g., the first query-plane 1206), a second query-plane corresponding to the magnitude refinement pass (e.g., the second query-plane 1306), and/or a third query-plane corresponding to the cleanup pass (e.g., the third query-plane 1404). In the initialized query-planes, the binary-value variable of each element of the query-plane may be initialized as 0. In some embodiments, the query-plane may be updated according to the current decoding pass associated with the current bit-plane to be decoded. In some embodiments, for the current bit-plane to be decoded, the decoding module 360 may perform the decoding for the significance propagation pass based on the searching of the first query-plane. The decoding module 360 may perform the decoding for the magnitude refinement pass based on the searching of the second query-plane. The decoding module 360 may perform the decoding for the cleanup pass based on the searching of the third query-plane.

In 1510, the processor (e.g., the decoding module 360 of the image decoding engine 240) may determine a most significant bit-plane (MSB). In some embodiments, the determined plurality of bit-planes may be organized from the MSB to LSB in sequence. The decoding module 360 may identify the MSB, and firstly decode the MSB along the cleanup pass.

In 1512, the processor (e.g., the third query-plane determination unit 406 of the query-plane determination module 340) may obtain a current third query-plane corresponding to the cleanup pass.

In some embodiments, the third query-plane determination unit 406 may determine the current third query-plane corresponding to MSB. Referring back to FIG. 14, the third query-plane may be determined according to current undecoded-plane. For the MSB, each coefficient bit may need to be decoded, therefore, the binary-value variable of each element may be reset to 1 in the current third query-plane. Each element may correspond to each coefficient bit in the MSB, respectively. For example, assuming that the current third undecoded-plane 1402 may be represented as $$\begin{bmatrix} 1 & \cdots & 1 \\ 1 & \cdots & 1 \\ 1 & \cdots & 1 \end{bmatrix},$$

where the binary-value variable "1" indicates the undecoded state of the coefficient bit. The third query-plane 1404 may be determined based on the current third undecoded-plane 1402, that is, $$\begin{bmatrix} 1 & \cdots & 1 \\ 1 & \cdots & 1 \\ 1 & \cdots & 1 \end{bmatrix}.$$

In 1514, the processor (e.g., the searching module 350 of the image decoding engine 240) may search the current third query-plane according to a third searching algorithm.

In some embodiments, the third searching algorithm may include but not limited to a sequential search algorithm, a binary search algorithm, an interpolation search algorithm, a binary hash search algorithm, a binary search tree algorithm, or a Fibonacci search algorithm.

The searching module 350 may determine whether or not there is an undecoded coefficient bit in the current bit-plane (e.g., the MSB), as illustrated in 1516. In the current third query-plane, the coefficient bits, corresponding to the elements having the value 1, may be designated as the undecoded coefficient bits. As used herein, the undecoded coefficient bits corresponding to the first query-plane may be also referred to as third coefficient bits. If there is the value "1" in the current third query-plane, the searching module 350 may determine that there is the undecoded coefficient bit in the current third query-plane. The processor may proceed to operation 1518. If there is no value "1" in the current third query-plane, the searching module 350 may determine that there is the no undecoded coefficient bit in the current third query-plane. The processor may proceed to operation 1524. In 1524, the processor may determine whether or not the current decoding bit-plane is the last bit-plane. If the current decoding bit-plane is the last bit-plane, the processor may terminate the decoding of the current code block. Otherwise, the processor may proceed to operation 1526.

In 1518, the processor (e.g., the searching module 350 of the image decoding engine 240) may obtain the undecoded bit (e.g., the third coefficient bit(s)) in the current third query-plane. In some embodiments, the searching module 350 may search the elements having the value 1 in the current third query-plane, and transmit positions of these elements to the decoding module 360.

In 1520, the processor (e.g., the third decoding unit 412 of the decoding module 360 of the image decoding engine 240) may decode the undecoded bit (e.g., the third coefficient bit(s)) along the cleanup pass.

In some embodiments, the third decoding unit 412 may perform a bit-plane decoding and an arithmetic decoding for the current bit-plane. During the bit-plane decoding phase, the third decoding unit 412 may determine a context for each third coefficient bit. In JPEG 2000, the context may depend on a decoding method. For the bit-plane decoding along the cleanup pass, the decoding method may include a zero decoding (ZD), a sign decoding (SD), and/or a run length decoding (RLD). After completion of the bit-plane decoding, the third decoding unit 412 may perform the arithmetic decoding. The third decoding unit 412 may take as input the context and the compressed code stream data associated with the current coefficient bit to be decoded, and determine a decision. The decision may be a binary-value variable (0 or 1). In some embodiments, the third decoding unit 412 may decode the third coefficient bits one by one. In some embodiments, the third decoding unit 412 may decode the third coefficient bits in parallel.

During the decoding along the cleanup pass, at the same time, the current third query-plane may be updated, as illustrated in 1522. For example, when a coefficient bit has been decoded, its corresponding element in the current third query-plane may be reset to 0. The third decoding unit 412 may continue the decoding according to the updated third query-plane, until all third coefficient bits are decoded.

After completion of the decoding of the MSB, the processor may proceed to operation 1524. In 1524, the processor (e.g., the image decoding engine 240) may determine whether or not the current decoding bit-plane is the last bit-plane. If the current decoding bit-plane is the last bit-plane, the processor may terminate the decoding of the current code block. Otherwise, the processor may proceed to operation 1526.

In 1526, the processor (e.g., the image decoding engine 240) may move to a next bit-plane to decode. In some embodiments, for each other bit-planes excluding the MSB, the image decoding engine 240 may need to decode the coefficient bits in the bit-plane to decoded along three decoding pass (e.g., the significance propagation pass, the magnitude refinement pass, and the cleanup pass) respectively. For example, the image decoding engine 240 may decode first coefficient bits of the current bit-plane corresponding to the most significance pass. As another example, the image decoding engine 240 may decode second coefficient bits of the current bit-plane corresponding to the magnitude refinement pass. As a further example, the image decoding engine 240 may decode third coefficient bits of the current bit-plane corresponding to the cleanup pass. In some embodiments, a total of the first coefficient bits, the second coefficient bits, and the third coefficient bits may be equal to the whole coefficient bits in the current bit-plane.

In 1528, the processor (e.g., the first query-plane determination unit 402 of the query-plane determination module 340) may obtain a current first query-plane corresponding to the significance propagation pass.

In some embodiments, the first query-plane determination unit 402 may determine the current first query-plane for the current bit-plane. Referring back to FIG. 12, the first query-plane determination unit 402 may determine the first query-plane 1206 by performing logic operations (e.g., an AND operation, an OR operation, a NOT operation) for the first significance-plane 1202 and the first undecoded-plane 1204. When the decoding module 360 begins to decode the current bit-plane, a preliminary first significance-plane (S1) and a preliminary first undecoded-plane (U1) may be obtained. The preliminary first significance-plane may depend on the entropy decoding result of a previous bit-plane (e.g., the MSB). For example, assuming that the entropy decoding result of the previous MSB is represented as an array $$\begin{bmatrix} 1 & \cdots & 0 \\ 0 & \cdots & 0 \\ 0 & \cdots & 1 \end{bmatrix},$$

where each element of the array denotes a decision determined by the third decoding unit 412. The preliminary first significance-plane S1 may be represented as $$\begin{bmatrix} 1 & \cdots & 0 \\ 0 & \cdots & 0 \\ 0 & \cdots & 1 \end{bmatrix},$$

where 1 indicates the coefficient bit is significant, and 0 indicates the coefficient bit is non-significant. The preliminary first undecoded-plane U1 may be represented as $$\begin{bmatrix} 1 & \cdots & 1 \\ 1 & \cdots & 1 \\ 1 & \cdots & 1 \end{bmatrix},$$

which means all coefficient bits in the current bit may need to be decoded. The first query-plane determination unit 402 may determine the preliminary first query-plane by performing the logic operations for the S1 and U1. The preliminary first query-plane (Q1) may be determined to be as $$\begin{bmatrix} 0 & \cdots & 1 \\ 1 & \cdots & 1 \\ 1 & \cdots & 0 \end{bmatrix},$$

where 1 indicates the coefficient bit needs to be decoded along the significance pass.

In 1530, the processor (e.g., the searching module 350 of the image decoding engine 240) may search the current first query-plane (e.g., the preliminary first query-plane) according to a first searching algorithm.

In some embodiments, the first searching algorithm may include but not limited to a sequential search algorithm, a binary search algorithm, an interpolation search algorithm, a binary hash search algorithm, a binary search tree algorithm, or a Fibonacci search algorithm.

The searching module 350 may determine whether or not there is an undecoded bit in the current bit-plane, as illustrated in 1532. If there is no undecoded bit in the current bit-plane, the processor may proceed to operation 1548. If there is the undecoded bit in the current bit-plane, the processor may proceed to operation 1534.

Those skilled in the art would understand that in the conventional JPEG 2000, the bit-plane decoding is performed bit-plane by bit-plane. For each bit-plane, bit by bit may be scanned according to the scan pattern illustrated in FIG. 9. Next coefficient bit may be allowed to decode as long as a current coefficient bit has been decoded. It is a waste of time that a waiting period may exist between two decoding operations for the current coefficient bit and the next coefficient bit. In some embodiments, the processor may resolve this issue by performing operation 1534. The decoding module 360 may decode at least two coefficient bits in parallel during the significance propagation pass.

In 1534, the processor (e.g., a first decoding unit 408 of the decoding module 360 of the image decoding engine) may perform a prediction process. Specifically, the first decoding unit 408 may predict a decision of the current decoding coefficient bit. In most cases, because it is a high probability that the decision of the coefficient bit is 0, the first decoding unit 408 may always predict that the decision of the current decoding coefficient bit is 0. Upon occurrence of the decision of the current coefficient bit, the first decoding unit 408 may perform the decoding for the next coefficient bit at the same time. In some embodiments, if the predicted decision is the same as the true decision, the first decoding unit 408 may proceed to operation 1536. For example, the predicted decision, as well as the true decision, is 0. In some embodiments, if the predicted decision is different from the true decision, the first decoding unit 408 may proceed to operation 1542. For example, the predicted decision is 0, the true decision is 1. In some embodiments, if the decision is 1, the first decoding unit 408 may need to perform the sign decoding (SD) for the corresponding coefficient bit. Therefore, upon occurrence of the sign decoding, it is proved that the prediction result is wrong. According to the prediction process, the next coefficient bit decoding may be started without waiting for completion of the current bit decoding.

In 1536, the processor (e.g., the searching module 350 of the image decoding engine 240) may obtain the undecoded bit in the current first query-plane. As used herein, the undecoded bits corresponding to the first query-plane may be also referred to as first coefficient bits. In some embodiments, the searching module 350 may search the elements having the value 1 in the current first query-plane, and transmit positions of these elements to the first decoding unit 408.

In 1538, the processor (e.g., the first decoding unit 408 of the decoding module 360 of the image decoding engine 240) may decode the undecoded coefficient bit (e.g., the first coefficient bit(s)) along the significance propagation pass.

In some embodiments, the first decoding unit 408 may perform the bit-plane decoding and the arithmetic decoding for the current bit-plane. During the bit-plane decoding phase, the first decoding unit 408 may determine a context for each first coefficient bit. For the bit-plane decoding along the significance propagation pass, the first decoding unit 408 may select ZD, and/or SD to decode the first coefficient bit. After completion of the bit-plane decoding, the first decoding unit 408 may perform the arithmetic decoding. The first decoding unit 408 may take as input the context and the compressed code stream data associated with the current coefficient bit to be decoded, and determine the decision.

During the decoding along the significance propagation pass, at the same time, the current first query-plane may be updated, as illustrated in 1540. In some embodiments, in a case that the predicted decision may be the same as the true decision, the processor (e.g., the first query-plane determination unit 402) may update the first query-plane. For example, when a first coefficient bit has been decoded, its corresponding element in the current first undecoded-plane may be reset to 0. The first query-plane may also be updated due to the updated first undecoded-plane accordingly. The first decoding unit 408 may continue the decoding according to the updated first query-plane, until all the coefficient bits are decoded. When the first decoding unit 408 has decoded all first coefficient bits in the current first query-plane, the processor may proceed to operation 1548.

In some embodiments, in a case that the predicted decision may be different from the true decision, the processor (e.g., the first query-plane determination unit 402) may also update the first query-plane. For example, when the decoded decision of a coefficient bit is 0, in the current first significance-plane, the non-significance state corresponding to the coefficient bit may remain unchanged. However, when the decision of a coefficient bit is 1, in the current first significance-plane, the non-significance state corresponding to the coefficient bit may be changed to the significance state. The current first significance-plane may be updated accordingly. At the same time, because the coefficient bit has been decoded, its corresponding element in the current first undecoded-plane may be reset to 0. Therefore, the first query-plane may be updated according to the updated first significance-plane and the updated first undecoded-plane. The first decoding unit 408 may continue the decoding according to the updated first query-plane, until all the coefficient bits are decoded. When the first decoding unit 408 has decoded all first coefficient bits in the current first query-plane, the processor may proceed to operation 1548. As used herein, after completion of the decoding along the significance propagation pass, the first significance-plane may be updated as S2, the first undecoded-plane may be updated as U2.

When the predicted decision is different from the true decision, after operation 1540, the processor may proceed to operation 1542. In 1542, the processor (e.g., the searching module 350 of the image decoding engine 240) may obtain the undecoded bit (e.g., the first coefficient bit(s)) in the current updated first query-plane. For example, the searching module 350 may search the elements having the value 1 in the current first query-plane, and transmit positions of these elements to the first decoding unit 408.

In 1544, the processor (e.g., the first decoding unit 408 of the decoding module 360 of the image decoding engine 240) may decode the undecoded coefficient bit (e.g., the first coefficient bit(s)) along the significance propagation pass.

In 1546, after completion of the decoding of the coefficient bit, the current first query-plane may be updated. The first decoding unit 408 may continue the decoding according to the updated first query-plane until all the coefficient bits are decoded. When the first decoding unit 408 has decoded all first coefficient bits in the current first query-plane, the processor may proceed to operation 1548.

In 1548, the processor (e.g., the second query-plane determination unit 404 of the query-plane determination module 340) may obtain a current second query-plane corresponding to the magnitude refinement pass.

In some embodiments, the second query-plane determination unit 404 may determine the current second query-plane for the current bit-plane. Referring back to FIG. 13, as illustrated in FIG. 13, the second query-plane determination unit 404 may determine the second query-plane 1306 by performing logic operations for the second significance-plane 1302 and the second undecoded-plane 1304.

In some embodiments, when the image decoding engine 240 begins to decode the current bit-plane along the magnitude refinement pass, the second significance-plane and a preliminary second undecoded-plane may be obtained by the second query-plane determination unit 404. The second significance-plane may depend on the entropy decoding result of the previous bit-plane (e.g., the MSB). For example, the second significance-plane may be the same as the preliminary first significance-plane (S1). Noted that the second significance-plane may remain unchanged during the decoding along the magnitude refinement pass. The preliminary second undecoded-plane may depend on the first undecoded-plane at which the significance pass decoding of the current bit-plane is completed. For example, the preliminary second undecoded-plane may be the same as U2.

In 1550, the processor (e.g., the searching module 350 of the image decoding engine 240) may search the current second query-plane according to a second searching algorithm.

In some embodiments, the second searching algorithm may include but not limited to a sequential search algorithm, a binary search algorithm, an interpolation search algorithm, a binary hash search algorithm, a binary search tree algorithm, or a Fibonacci search algorithm.

The searching module 350 may determine whether or not there is an undecoded bit in the current bit-plane, as illustrated in 1552. If there is no undecoded bit in the current bit-plane, the processor may proceed to operation 1512. If there is the undecoded bit in the current bit-plane, the processor may proceed to operation 1554.

In 1554, the processor (e.g., the searching module 350 of the image decoding engine 240) may obtain the undecoded bit (e.g., the second coefficient bit(s)) in the current second query-plane. In some embodiments, the searching module 350 may search the elements having the value 1 in the current second query-plane, and transmit positions of these elements to the second decoding unit 410.

In 1556, the processor (e.g., the second decoding unit 410 of the decoding module 360 of the image decoding engine 240) may decode the undecoded coefficient bit (e.g., the second coefficient bit(s)) along the magnitude refinement pass.

In some embodiments, the second decoding unit 410 may perform the bit-plane decoding and the arithmetic decoding for the current bit-plane. During the bit-plane decoding phase, the second decoding unit 410 may determine a context for each second coefficient bit. For the bit-plane decoding along the magnitude refinement pass, the second decoding unit 410 may select MRD to decode the second coefficient bit. After completion of the bit-plane decoding, the second decoding unit 410 may perform the arithmetic decoding. The second decoding unit 410 may take as input the context and the compressed code stream data associated with the current coefficient bit to be decoded, and determine the decision.

During the decoding along the magnitude refinement pass, at the same time, the second query-plane may be updated, as illustrated in 1558. For example, when a coefficient bit has been decoded, its corresponding element in the current second undecoded-plane may be reset to 0. The second query-plane determination unit 404 may update, based on the updated second undecoded-plane, the second query-plane accordingly. The second decoding unit 410 may continue the decoding according to the updated second query-plane until all the coefficient bits are decoded. When the second decoding unit 410 has decoded all coefficient bits to be decoded in the second query-plane, the processor may proceed to operation 1512. As used herein, after completion of the decoding along the magnitude refinement pass, the second undecoded-plane may be updated as U3.

After completion of the decoding along the magnitude refinement pass, the remaining undecoded coefficient bits of the current bit-plane may need to be decoded along the cleanup pass. In 1512, the processor (e.g., the third query-plane determination unit 406 of the query-plane determination module 340) may obtain the current third query-plane corresponding to the cleanup pass. The third query-plane determination unit 406 may determine the third query-plane for the current bit-plane. The third undecoded-plane may depend on the second undecoded-plane at which the magnitude refinement pass decoding of the current bit-plane is completed. For example, the third undecoded-plane may be the same as U3. The third query-plane may be the same as the third undecoded-plane. The third query-plane may also be same as U3. It should be understood that, after completion of the decoding of the cleanup pass, the third query-plane may be updated as U4, and each element of U4 is equal to 0, which means all coefficient bits (a total of the first coefficient bits, the second coefficient bits, and the third coefficient bits) in the current bit-plane have been decoded.

In some embodiments, the searching module 350 may search the current third query-plane according to the third searching algorithm (1514). The searching module 350 may determine whether or not there is an undecoded bit in the current bit-plane (1516). If the searching module 350 may determine that there is the undecoded bit in the current third query-plane. The searching module 350 may further search and obtain the undecoded bit (e.g., the third coefficient bit(s)) in the current third query-plane (1518). The third decoding unit 412 may decode the undecoded bit along the cleanup pass (1520). During the decoding along the cleanup pass, at the same time, the third query-plane may be updated (1522). The third decoding unit 412 may continue the decoding according to the updated third query-plane until all third coefficient bits are decoded.

For the current bit-plane, after completion of the decoding along the cleanup pass, as illustrated in 1524, the processor may determine whether or not the current decoding bit-plane is the last bit-plane. If the current decoding bit-plane is the last bit-plane, the processor may terminate the decoding of the current code block. Otherwise, the processor may proceed to operation 1526, and begin the decoding for next bit-plane.

It should be noted that, the description above is only for illustration purposes, and is not intended to limit the scope of the present application. It should be understood that, after understanding the principle of the system, those skilled in the art may make any modification or transformation to the form and details of implementation of the above methods and application of the system, in the case of not deviate from the principle. For example, the operation 1514 and the operation 1516 may be integrated into a single operation. As another example, the operation 1530 and the operation 1532 may be integrated into a single operation. As a further example, the operation 1550 and the operation 1552 may be integrated into a single operation.

Figure 16:
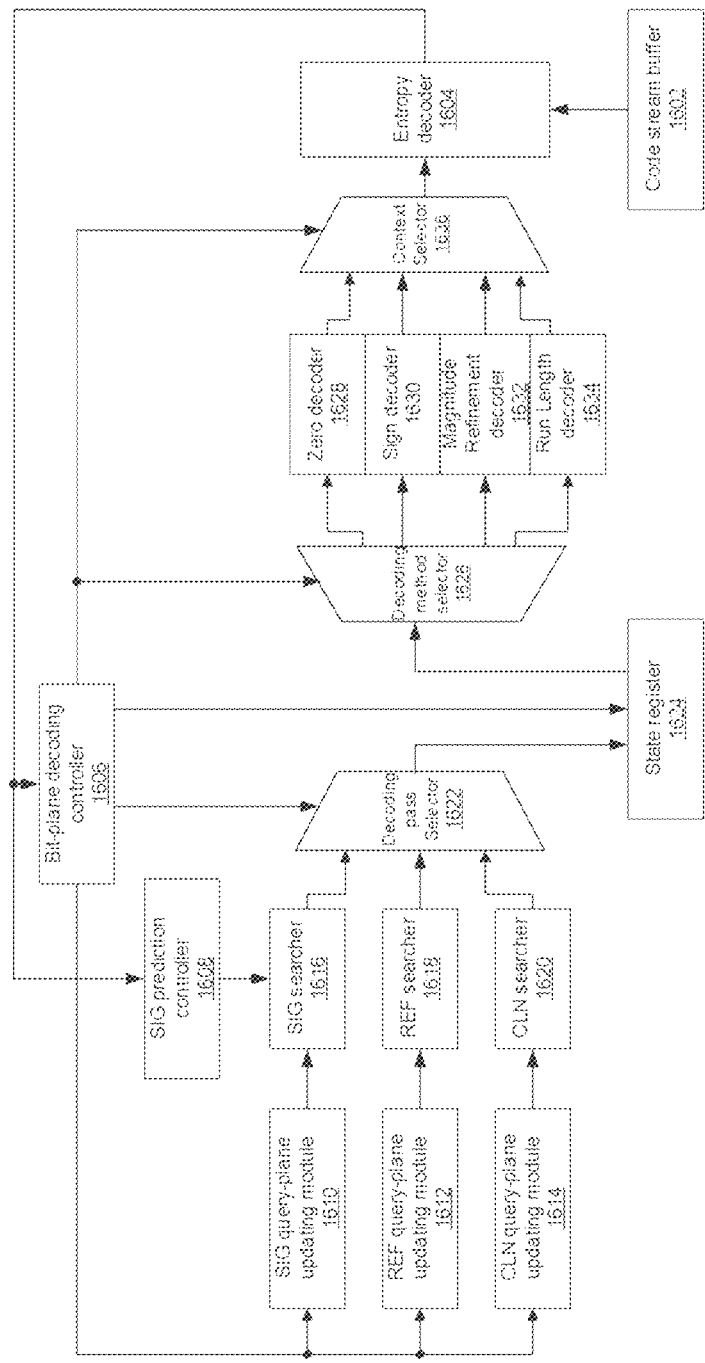
FIG. 16 is a schematic diagram illustrating an exemplary image decoding device according to some embodiments of the present disclosure.

FIG. 16 is a schematic diagram illustrating an exemplary image decoding device according to some embodiments of the present disclosure. As shown in FIG. 16, image decoding device 1600 may include a code stream buffer 1602, an entropy decoder 1604, a bit-plane decoding controller 1606, a SIG prediction controller 1608, a SIG query-plane updating module 1610, a REF query-plane updating module 1612, a CLN query-plane updating module 1614, a SIG searcher 1616, a REF searcher 1618, a CLN searcher 1620, a decoding pass selector 1622, a state register 1624, a decoding method selector 1626, a zero decoder 1628, a sign decoder 1630, a magnitude refinement decoder 1632, a run length decoder 1634, and a context selector 1636. In some embodiments, the image decoding device (or referred to as an image decoder) 1600 may be implemented as the image decoding engine 240 of the image processing system 110.

The code stream buffer 1602 may be configured to store an encoded code stream from an image encoding device (e.g., the image encoding engine 230). In some embodiments, the code stream buffer 1602 may decompose the encoded code stream into a plurality of code blocks, and obtain compressed data corresponding to a plurality of bit-planes included in each code block. The code stream buffer 1602 may transmit the decomposed data of the bit-plane or the code block to the entropy decoder 1604.

The entropy decoder 1604 may be configured to perform an arithmetic decoding for the received data, and generate a decision for the coefficient bit to be decoded. In some embodiments, the received data may include the decomposed data and context output by the context selector 1636. For a code block to be decoded, an initialized context may be used to entropy decode the first coefficient bit of the first bit-plane (i.e., the MSB). The initialized context is 17. The decision may be sent to the bit-plane decoding controller 1606, the SIG prediction controller 1608, and/or the state register 1624.

The bit-plane decoding controller 1606 may be configured to control the bit-plane decoding for the coefficient bit. For example, during the bit-plane decoding phase, the bit-plane decoding controller 1606 may command the SIG query-plane updating module 1610 to update the SIG query-plane (e.g., the first query-plane 1206) based on the decision. The bit-plane decoding controller 1606 may command the REF query-plane updating module 1612 to update the REF query-plane (e.g., the second query-plane 1306) based on the decision. The bit-plane decoding controller 1606 may command the CLN query-plane updating module 1614 to update the CLN query-plane (e.g., the third query-plane 1404) based on the decision. In some embodiments, according to FIGS. 12-14 and the description thereof, the SIG query-plane updating module 1610, the REF query-plane updating module 1612, and the CLN query-plane updating module 1614 may update corresponding query-planes, respectively. In some embodiments, the bit-plane decoding controller 1606 may command the decoding pass selector 1622 to select the decoding pass (e.g., the significance propagation pass, the magnitude refinement pass, or the cleanup pass). In some embodiments, the bit-plane decoding controller 1606 may command the state register 1624 to output significance states of the coefficient bit to be decoded and/or its eight neighbors. In some embodiments, the bit-plane decoding controller 1606 may command the decoding method selector 1626 to select a decoding method (e.g., the zero decoding, the sign decoding, the magnitude refinement decoding, a sign decoding, or a run length decoding). In some embodiments, the bit-plane decoding controller 1606 may command the context selector 1636 to determine a context corresponding to the decoding method.

The SIG prediction controller 1608 may be configured to predict a decision of the current coefficient bit to be decoded, and determine whether or not the predicted decision is true. After the prediction, the SIG controller may command the SIG searcher 1616 to search the SIG query-plane from the SIG query-plane updating module 1610. Upon the search of the SIG searcher 1616, the decoding pass selector 1622 may select the significance propagation pass to decode. Upon receipt of the selected decoding pass, the state register may output the current coefficient bit and its eight neighbors, and the significance states thereof. Then the decoding method selector 1626 may select the decoding method (e.g., the zero decoding, or sign decoding), and select the corresponding decoder. For example, in the decoding for the significance propagation pass, the zero decoder may take as input the decision, and output the context corresponding to the decoding method through the context selector 1636. The context selector 1636 may be configured to select the context corresponding to the decoding method.

As similar to the process of the decoding along the significance propagation pass, the image decoder 1600 may also perform the decoding along the magnitude refinement pass, and/or the cleanup pass through one or more components of the image decoder 1600.

In some embodiments, the decision output by the entropy decoder 1604 may be stored in the state register 1624. The decision may be designated as a quantization coefficient. The inverse quantization (e.g., the inverse quantization 516), and the inverse transform (e.g., the inverse transform 518) may be performed for the decisions of the plurality of bit-planes. After the inverse transform operation, a final decoded data (e.g., the reconstructed image) may be generated.

It should be noted that the description above is only for illustration purposes, and is not intended to limit the scope of the present application. It should be understood that, after understanding the principle of the system, those skilled in the art may make any modification or transformation to the form and details of implementation of the above methods and application of the system, in the case of not deviate from the principle.

Figure 17:
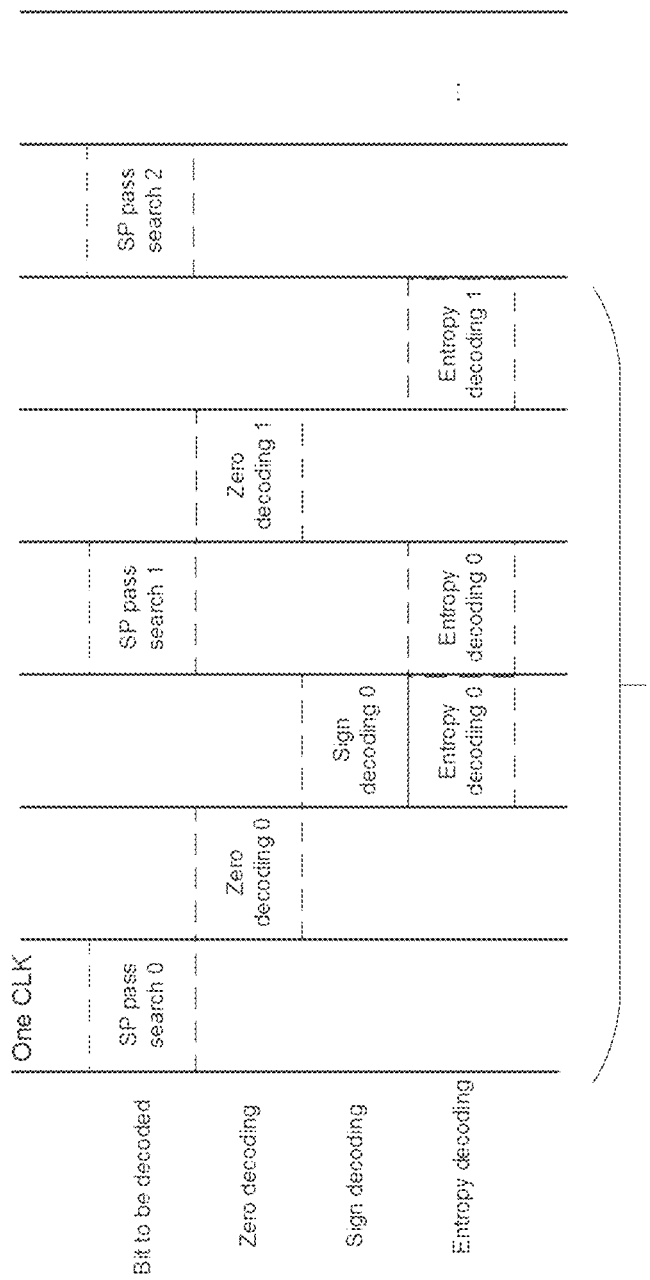
FIG. 17 is a schematic diagram illustrating an exemplary pipeline that lacks a prediction in decoding a significance propagation pass decoding according to some embodiments of the present disclosure.

FIG. 17 illustrates an exemplary pipeline 1700 that lacks a prediction in decoding a significance propagation pass decoding according to some embodiments of the present disclosure. As illustrated in FIG. 17, a length between two adjacent vertical lines stands for one clock cycle. Each dotted box denotes a processing operation. The zero decoding illustrated in FIG. 17 may include the zero decoding operation and a decision generating operation. The entropy decoding may only include a state updating of an entropy decoder, regardless of the decision generating operation. The sign decoding may include a sign decoding operation. When the generated decision corresponding to the coefficient bit is 1, the coefficient bit may need to be sign decoded. During the decoding for the significance propagation pass, in the first clock, a first coefficient bit to be decoded may be searched (e.g., the SIG pass search 0). In the second clock, the searched first coefficient bit may be zero decoded (e.g., the zero decoding 0). After the zero decoding, in the third clock, the first coefficient bit may be entropy decoded (e.g., the entropy decoding 0), and/or sign decoded (e.g., the sign decoding 0). A second coefficient bit may be searched and decoded only if the entropy decoding is completed. In some embodiments, a decoding period for each coefficient bit in the significance pass may include three clock cycles.

Figure 18:
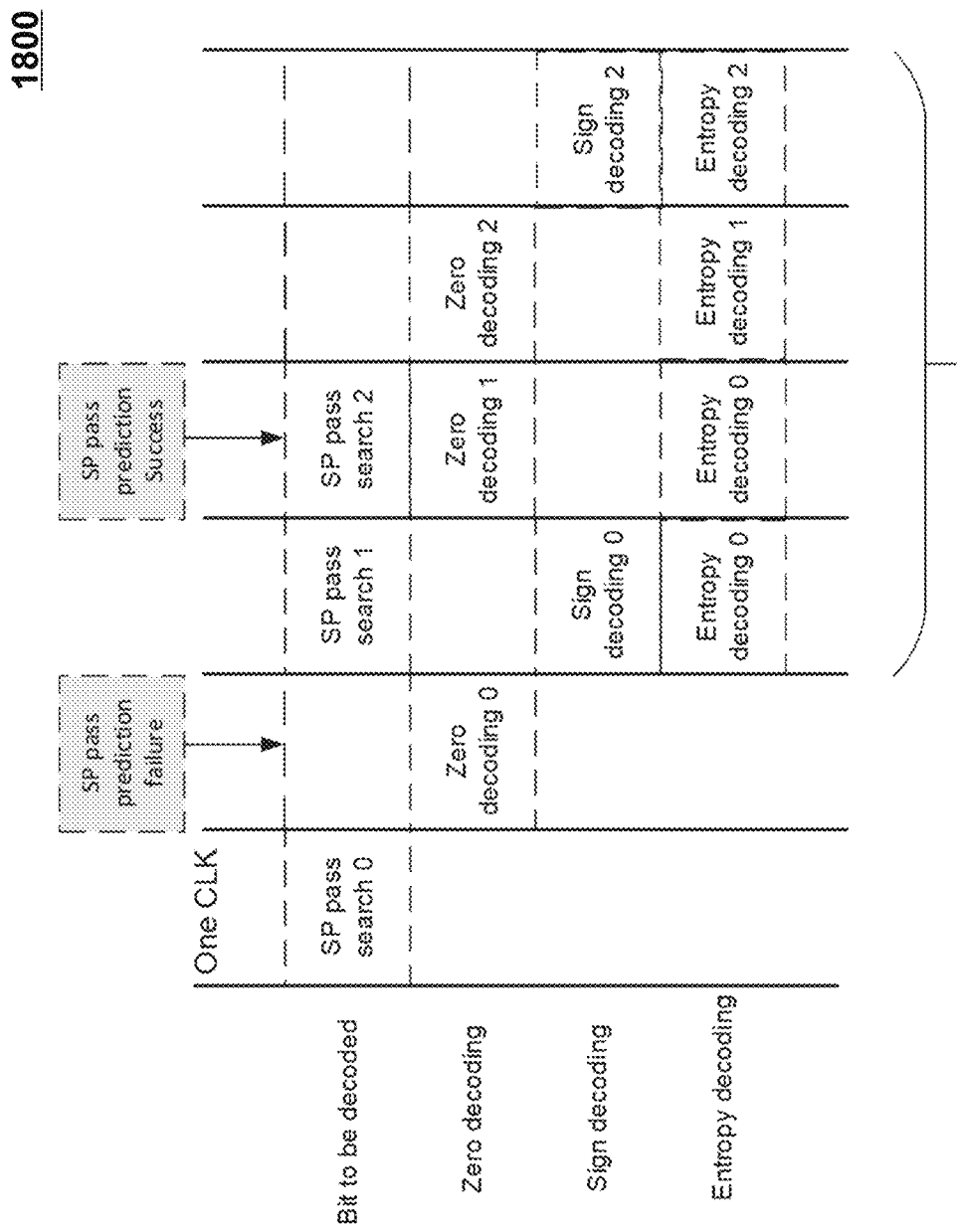
FIG. 18 is a schematic diagram illustrating an exemplary pipeline that includes prediction in decoding a significance propagation pass decoding according to some embodiments of the present disclosure.

FIG. 18 illustrates an exemplary pipeline 1800 that includes a prediction in decoding a significance propagation pass decoding according to some embodiments of the present disclosure. As illustrated in FIG. 18, during the decoding for the significance propagation pass, in the first clock, a first coefficient bit to be decoded may be searched (e.g., the SIG pass search 0). In the second clock, the searched first coefficient bit may be zero decoded (e.g., the zero decoding 0). At the same time, a decision corresponding to the first coefficient bit may be predicted. The predicted decision is always 0. If the true decision generated by the zero decoding is 1, which means the prediction is unsuccessful (e.g., SIG pass prediction failure). In this case, a second coefficient bit may be searched delayed to the third clock (e.g., the SIG pass search 1). In the fourth clock, the searched second coefficient bit may be zero decoded (e.g., zero decoding 1). At the same time, a decision corresponding to the second coefficient bit may be predicted. If the true decision generated by the zero decoding is 0, which means the prediction is successful (e.g., SIG pass prediction success). In this case, a third coefficient bit may be searched in the current fourth clock (e.g., the SIG pass search 1). In the occasion that the prediction is successful, it may take four clocks to finish the decoding of two coefficients bit. As illustrated in FIG. 17, if the decoding without the prediction in the significance propagation pass, it may have to take six clocks to finish the decoding of two coefficients bit. The prediction operation may accelerate the decoding of the coefficient bit along the significance propagation pass.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.

NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A method for decoding an encoded code stream, comprising:
    obtaining the encoded code stream;
    determining a plurality of code blocks based on the encoded code stream;
    determining a plurality of bit-planes for each of the plurality of code blocks, the plurality of bit-planes ranging from a most significant bit-plane to a least significant bit-plane;
    determining at least one query-plane for each of the plurality of bit-planes; and
    decoding, based on the at least one query-plane, each of the plurality of bit-planes.

2. The method of claim 1, wherein the at least one query-plane includes at least one of a first query-plane corresponding to a significance propagation pass, a second query-plane corresponding to a magnitude refinement pass, or a third query-plane corresponding to a cleanup pass.

3. The method of claim 2,
    wherein the first query-plane is determined based on a first significance-plane and a first undecoded-plane;
    the second query-plane is determined based on a second significance-plane and a second undecoded-plane; and
    the third query-plane is determined based on a third undecoded-plane.

4. The method of claim 2, wherein the first query-plane, the second query-plane, and the third query-plane are associated with each other.

5. The method of claim 2, wherein the decoding, based on the at least one query-plane, each of the plurality of bit-planes includes:
    decoding the each of the plurality of bit-planes along the significance propagation pass, the magnitude refinement pass, or the cleanup pass.

6. The method of claim 5, wherein the decoding the each of the plurality of bit-planes along the significance propagation pass, the magnitude refinement pass, or the cleanup pass includes:
    decoding the most significant bit-plane along the cleanup pass; and
    decoding other bit-planes of the plurality of bit-planes excluding the most significant bit-plane along the significance propagation pass, the magnitude refinement pass, and the cleanup pass.

7. The method of claim 6, wherein the decoding the other bit-planes of the plurality of bit-planes excluding the most significant bit-plane along the significance propagation pass, the magnitude refinement pass, and the cleanup pass includes:
    for each of the other bit-planes of the plurality of bit-planes excluding the most significant bit-plane,
        predicting a decision regarding a current decoding bit along a most significance pass;
        decoding first bits of the bit-plane corresponding to the most significance pass by searching, according to a first searching algorithm, the first query-plane based on the predicted decision;
        decoding second bits of the bit-plane corresponding to the magnitude refinement pass by searching, according to a second searching algorithm, the second query-plane; and
        decoding third bits of the bit-plane corresponding to the cleanup pass by searching, according to a third searching algorithm, the third query-plane.

8. The method of claim 7, wherein the first searching algorithm, the second searching algorithm, or the third searching algorithm includes at least one of a sequential search algorithm, a binary search algorithm, an interpolation search algorithm, a binary hash search algorithm, a binary search tree algorithm, or a Fibonacci search algorithm.

9. A system for decoding an encoded code stream, comprising:
    a storage device storing a set of instructions;
    at least one processor in communication with the storage device, wherein when executing the set of instructions, the at least one processor is configured to cause the system to:
        obtain the encoded code stream;
        determine a plurality of code blocks based on the encoded code stream;
        determine a plurality of bit-planes for each of the plurality of code blocks, the plurality of bit-planes ranging from a most significant bit-plane to a least significant bit-plane;
        determine at least one query-plane for each of the plurality of bit-planes; and
        decode, based on the at least one query-plane, each of the plurality of bit-planes.

10. The system of claim 9, wherein the at least one query-plane includes at least one of a first query-plane corresponding to a significance propagation pass, a second query-plane corresponding to a magnitude refinement pass, or a third query-plane corresponding to a cleanup pass.

11. The system of claim 10, wherein the at least one processor is further configured to cause the system to:
determine, based on a first significance-plane and a first undecoded-plane, the first query-plane.

12. The system of claim 10, wherein the at least one processor is further configured to cause the system to:
determine, based on a second significance-plane and a second undecoded-plane, the second query-plane.

13. The system of claim 10, wherein the at least one processor is further configured to cause the system to:
determine, based on a third undecoded-plane, the third query-plane.

14. The system of claim 10, wherein the first query-plane, the second query-plane, and the third query-plane are associated with each other.

15. The system of claim 10, wherein to decode, based on the at least one query-plane, each of the plurality of bit-planes, the at least one processor is further configured to cause the system to:
decode the each of the plurality of bit-planes along the significance propagation pass, the magnitude refinement pass, or the cleanup pass.

16. The system of claim 15, wherein to decode the each of the plurality of bit-planes along the significance propagation pass, the magnitude refinement pass, or the cleanup pass, the at least one processor is further configured to cause the system to:
decode the most significant bit-plane along the cleanup pass; and
decode other bit-planes of the plurality of bit-planes excluding the most significant bit-plane along the significance propagation pass, the magnitude refinement pass, and the cleanup pass.

17. The system of claim 16, wherein to decode the other bit-planes of the plurality of bit-planes excluding the most significance bit plane along the significance propagation pass, the magnitude refinement pass, and the cleanup pass, the at least one processor is further configured to cause the system to:
for each of the other bit-planes of the plurality of bit-planes excluding the most significance bit-plane,
predict a decision regarding a current decoding bit along a most significance pass;
decode first bits of the bit-plane corresponding to the most significance pass by searching, according to a first searching algorithm, the first query-plane based on the predicted decision;
decode second bits of the bit-plane corresponding to the magnitude refinement pass by searching, according to a second searching algorithm, the second query-plane; and
decode third bits of the bit-plane corresponding to the cleanup pass by searching, according to a third searching algorithm, the third query-plane.

18. The system of claim 17, wherein the first searching algorithm, the second searching algorithm, or the third searching algorithm includes at least one of a sequential search algorithm, a binary search algorithm, an interpolation search algorithm, a binary hash search algorithm, a binary search tree algorithm, or a Fibonacci search algorithm.

19. The system of claim 17, wherein the first searching algorithm, the second searching algorithm, and the third searching algorithm are the same or different.

20. A non-transitory computer readable medium comprising a set of instructions that, when executed by at least one processor, cause the at least one processor to effectuate a method comprising:
obtaining the encoded code stream;
determining a plurality of code blocks based on the encoded code stream;
determining a plurality of bit-planes for each of the plurality of code blocks, the plurality of bit-planes ranging from a most significant bit-plane to a least significant bit-plane;
determining at least one query-plane for each of the plurality of bit-planes; and
decoding, based on the at least one query-plane, each of the plurality of bit-planes.

* * * * *